US012786734B2

(12) United States Patent
Kim et al.

(10) Patent No.: US 12,786,734 B2
(45) Date of Patent: Nov. 3, 2026

(54) METHOD AND APPARATUS FOR ESTIMATING MAXIMUM ALLOWABLE POWER IN FREQUENCY SHARING SYSTEM

(71) Applicant: ELECTRONICS AND TELECOMMUNICATIONS RESEARCH INSTITUTE, Daejeon (KR)

(72) Inventors: Igor Kim, Daejeon (KR); Seung Keun Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 260 days.

(21) Appl. No.: 18/897,988

(22) Filed: Sep. 26, 2024

(65) Prior Publication Data

US 2025/0106646 A1 Mar. 27, 2025

(30) Foreign Application Priority Data

Sep. 26, 2023 (KR) ........................ 10-2023-0129471

(51) Int. Cl.
*H04L 12/00* (2006.01)
*H04W 4/02* (2018.01)
*H04W 16/14* (2009.01)

(52) U.S. Cl.
CPC ........... *H04W 16/14* (2013.01); *H04W 4/025* (2013.01)

(58) Field of Classification Search
CPC ... H04W 16/14; H04W 4/025; H04W 52/243; H04W 52/283; H04W 84/12
USPC ........................................................ 370/329
See application file for complete search history.

(56) References Cited

U.S. PATENT DOCUMENTS

| | | | | |
|---|---|---|---|---|
| 8,718,693 | B2 | 5/2014 | Kang et al. | |
| 9,661,587 | B2 * | 5/2017 | Sawai | H04W 52/46 |
| 10,959,189 | B2 * | 3/2021 | Blankenship | H04W 52/146 |
| 11,234,135 | B2 | 1/2022 | Macmullan et al. | |
| 2009/0088083 | A1 * | 4/2009 | Fujii | H04W 52/242 455/63.1 |
| 2015/0245170 | A1 | 8/2015 | Cho et al. | |
| 2017/0359785 | A1 * | 12/2017 | Sawai | H04W 52/243 |
| 2021/0282022 | A1 * | 9/2021 | Hathiramani | H04W 16/14 |

(Continued)

FOREIGN PATENT DOCUMENTS

| | | | |
|---|---|---|---|
| JP | 2017-50882 | A | 3/2017 |
| KR | 10-2007-0048678 | A | 5/2007 |

(Continued)

*Primary Examiner* — Frantz Coby

(57) ABSTRACT

The present disclosure relates to a method and apparatus for estimating maximum allowable power in a frequency sharing system. A method for performing an available spectrum inquiry according to an embodiment of the present disclosure may comprise: determining an allowable power level for the second device based on whether there is an overlap between an exclusion area for the second device or at least one of the one or more protection area contours and a location uncertainty area of a first device; and transmitting a message for an available spectrum inquiry response including information on the determined allowable power level. Herein, the second device supporting another service whose frequency is shared with a specific service based on location-related information of the first device may be selected.

20 Claims, 22 Drawing Sheets

(56) References Cited

U.S. PATENT DOCUMENTS

| | | | | |
|---|---|---|---|---|
| 2024/0381268 | A1* | 11/2024 | Kim | H04W 16/14 |
| 2024/0406943 | A1* | 12/2024 | Yadav | H04W 16/14 |
| 2024/0430060 | A1* | 12/2024 | Elshafie | H04L 5/0051 |

FOREIGN PATENT DOCUMENTS

| | | | | |
|---|---|---|---|---|
| KR | 10-1135794 | B1 | 4/2012 | |
| KR | 10-2020-0106721 | A | 9/2020 | |
| KR | 10-2021-0111156 | A | 9/2021 | |
| KR | 10-2021-0142517 | A | 11/2021 | |
| KR | 10-2023-0026084 | A | 2/2023 | |
| WO | WO-2020256706 | A1 * | 12/2020 | H04W 16/14 |

* cited by examiner

METHOD AND APPARATUS FOR ESTIMATING MAXIMUM ALLOWABLE POWER IN FREQUENCY SHARING SYSTEM

CROSS-REFERENCE TO RELATED APPLICATIONS

This application claims the benefit of earlier filing date and right of priority to Korean Application No. 10-2023-0129471, filed on Sep. 26, 2023, the contents of which are all hereby incorporated by reference herein in their entirety.

TECHNICAL FIELD

The present disclosure relates to a method and apparatus for estimating/calculating the maximum allowable power for coexistence of a secondary user operating in a frequency band used by a primary user.

BACKGROUND

Recently, the 5925-7125 MHz frequency spectrum has been opened in some countries for frequency sharing between unlicensed and licensed devices. The licensed services currently using this band are fixed telecommunications services, fixed broadcasting services, and fixed satellite services. Licensed services operating in this band are considered primary users and have priority use of the spectrum.

On the other hand, unlicensed services such as Wi-Fi, LTE-LAA, NR-U, etc. are considered secondary users.

Introducing unlicensed services in the relevant band may cause harmful interference to existing primary primary services. Therefore, a system is needed to control spectrum utilization by secondary services to protect existing primary primary service links.

SUMMARY

The technical object of the present disclosure is to provide a method and apparatus for estimating the maximum allowable power of a frequency sharing system.

The technical object of the present disclosure is to provide a communication protocol between a secondary user and a frequency sharing system.

The technical objects to be achieved by the present disclosure are not limited to the above-described technical objects, and other technical objects which are not described herein will be clearly understood by those skilled in the pertinent art from the following description.

A method for performing an available spectrum inquiry according to an aspect of the present disclosure may comprise: receiving a first message for an available spectrum inquiry request by a first device supporting a specific service; selecting a second device supporting another service whose frequency is shared with the specific service based on location-related information of the first device included in the first message; determining one or more protection area contours for the second device based on the location-related information; determining an allowable power level for the second device based on whether there is an overlap between an exclusion area for the second device or at least one of the one or more protection area contours and a location uncertainty area of the first device; and transmitting a second message for an available spectrum inquiry response including information on the determined allowable power level. Herein, the location-related information may include one or more of location coordinates, height, or uncertainty-related information for the first device.

An apparatus of performing an available spectrum inquiry according to an additional aspect of the present disclosure may comprise at least one processor and at least one memory, and the processor may configured to: receive a first message for an available spectrum inquiry request by a first device supporting a specific service; select a second device supporting another service whose frequency is shared with the specific service based on location-related information of the first device included in the first message; determine one or more protection area contours for the second device based on the location-related information; determine an allowable power level for the second device based on whether there is an overlap between an exclusion area for the second device or at least one of the one or more protection area contours and a location uncertainty area of the first device; and transmit a second message for an available spectrum inquiry response including information on the determined allowable power level. Herein, the location-related information may include one or more of location coordinates, height, or uncertainty-related information for the first device.

As one or more non-transitory computer readable medium storing one or more instructions, the one or more instructions may be executed by one or more processors and control an apparatus for performing an available spectrum inquiry to: receive a first message for an available spectrum inquiry request by a first device supporting a specific service; select a second device supporting another service whose frequency is shared with the specific service based on location-related information of the first device included in the first message; determine one or more protection area contours for the second device based on the location-related information; determine an allowable power level for the second device based on whether there is an overlap between an exclusion area for the second device or at least one of the one or more protection area contours and a location uncertainty area of the first device; and transmit a second message for an available spectrum inquiry response including information on the determined allowable power level. Herein, the location-related information may include one or more of location coordinates, height, or uncertainty-related information for the first device.

In various aspects of the present disclosure, if the location uncertainty area of the first device overlaps with the at least one of the protection area contours for the second device, the allowable power level may be determined based on power information configured for an overlapping protection area contour. In this regard, the power information includes a pair of a channel-based power value and a 1 MHz-based power value.

Additionally, in various aspects of the present disclosure, if the allowable power level is determined per channel of the first device based on the power value based on the channel, the allowable power level may be determined by checking whether there is overlap between each channel of the first device and each channel of the second device. The allowable power level may be determined by additionally applying a frequency dependent rejection value for each channel of the first device.

Additionally, in various aspects of the present disclosure, if the allowable power level is determined based on the 1 MHz-based power value, the allowable power level may be determined by checking a frequency range that overlaps a frequency requested by the first device and each channel of the second device.

Additionally, in various aspects of the present disclosure, if the location uncertainty area of the first device overlaps with the exclusion area for the second device, the allowable power level is set to a pre-defined minimum power level to restrict a channel and a frequency of the first device.

Additionally, in various aspects of the present disclosure, the first message may be defined to be retransmittable based on a pre-configured maximum number of retransmissions or pre-configured connection uniform resource locator (URL) information.

Additionally, in various aspects of the present disclosure, the first message and the second message may be transmitted and received through a proxy agent connected to the first device, and information included in the second message may be stored in a cache of the proxy agent.

According to the present disclosure, a method and apparatus for estimating the maximum allowable power of a frequency sharing system may be provided.

According to the present disclosure, a communication protocol between a secondary user and a frequency sharing system may be provided.

According to the present disclosure, there is an advantage in that frequency resource utility may be increased by efficiently controlling interference that may occur when licensed service users and unlicensed service users coexist in a frequency band.

Effects achievable by the present disclosure are not limited to the above-described effects, and other effects which are not described herein may be clearly understood by those skilled in the pertinent art from the following description.

DETAILED DESCRIPTION

Figure 1:
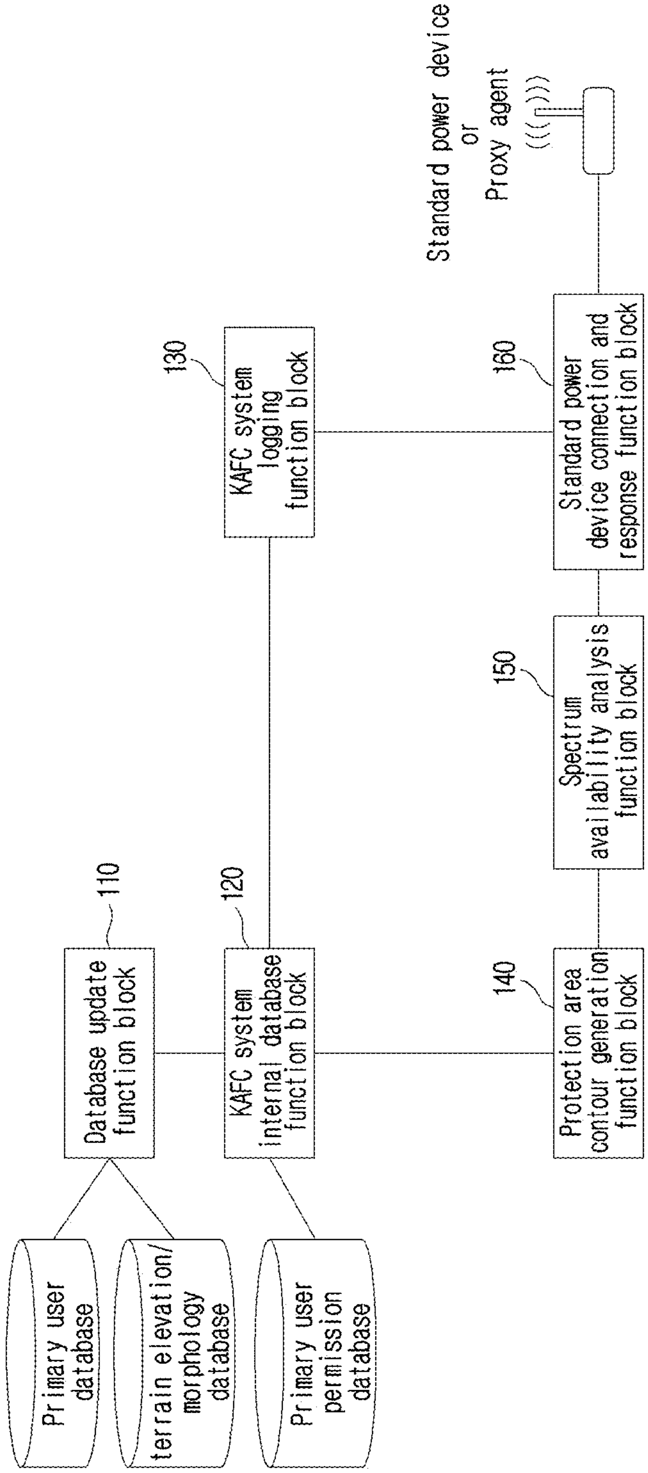
FIG. 1 illustrates a structure of a Korean-type Automated Frequency Coordination (KAFC) system according to an embodiment of the present disclosure.

As the present disclosure may make various changes and have multiple embodiments, specific embodiments are illustrated in a drawing and are described in detail in a detailed description. But, it is not to limit the present disclosure to a specific embodiment, and should be understood as including all changes, equivalents and substitutes included in an idea and a technical scope of the present disclosure. A similar reference numeral in a drawing refers to a like or similar function across multiple aspects. A shape and a size, etc. of elements in a drawing may be exaggerated for a clearer description. A detailed description on exemplary embodiments described below refers to an accompanying drawing which shows a specific embodiment as an example. These embodiments are described in detail so that those skilled in the pertinent art can implement an embodiment. It should be understood that a variety of embodiments are different each other, but they do not need to be mutually exclusive. For example, a specific shape, structure and characteristic described herein may be implemented in other embodiment without departing from a scope and a spirit of the present disclosure in connection with an embodiment. In addition, it should be understood that a position or an arrangement of an individual element in each disclosed embodiment may be changed without departing from a scope and a spirit of an embodiment. Accordingly, a detailed description described below is not taken as a limited meaning and a scope of exemplary embodiments, if properly described, are limited only by an accompanying claim along with any scope equivalent to that claimed by those claims.

In the present disclosure, a term such as first, second, etc. may be used to describe a variety of elements, but the elements should not be limited by the terms. The terms are used only to distinguish one element from other element. For example, without getting out of a scope of a right of the present disclosure, a first element may be referred to as a second element and likewise, a second element may be also referred to as a first element. A term of and/or includes a combination of a plurality of relevant described items or any item of a plurality of relevant described items.

When an element in the present disclosure is referred to as being "connected" or "linked" to another element, it should be understood that it may be directly connected or linked to that another element, but there may be another element between them. Meanwhile, when an element is referred to as being "directly connected" or "directly linked" to another element, it should be understood that there is no another element between them.

As construction units shown in an embodiment of the present disclosure are independently shown to represent different characteristic functions, it does not mean that each construction unit is composed in a construction unit of separate hardware or one software. In other words, as each construction unit is included by being enumerated as each construction unit for convenience of a description, at least two construction units of each construction unit may be combined to form one construction unit or one construction unit may be divided into a plurality of construction units to perform a function, and an integrated embodiment and a separate embodiment of each construction unit are also included in a scope of a right of the present disclosure unless they are beyond the essence of the present disclosure.

A term used in the present disclosure is just used to describe a specific embodiment, and is not intended to limit the present disclosure. A singular expression, unless the context clearly indicates otherwise, includes a plural expression. In the present disclosure, it should be understood that a term such as "include" or "have", etc. is just intended to designate the presence of a feature, a number, a step, an operation, an element, a part or a combination thereof described in the present specification, and it does not exclude in advance a possibility of presence or addition of one or more other features, numbers, steps, operations, elements, parts or their combinations. In other words, a description of "including" a specific configuration in the present disclosure does not exclude a configuration other than a corresponding configuration, and it means that an additional configuration may be included in a scope of a technical idea of the present disclosure or an embodiment of the present disclosure.

Some elements of the present disclosure are not a necessary element which performs an essential function in the present disclosure and may be an optional element for just improving performance. The present disclosure may be implemented by including only a construction unit which is necessary to implement essence of the present disclosure except for an element used just for performance improvement, and a structure including only a necessary element except for an optional element used just for performance improvement is also included in a scope of a right of the present disclosure.

Hereinafter, an embodiment of the present disclosure is described in detail by referring to a drawing. In describing an embodiment of the present specification, when it is determined that a detailed description on a relevant disclosed configuration or function may obscure a gist of the present specification, such a detailed description is omitted, and the same reference numeral is used for the same element in a drawing and an overlapping description on the same element is omitted.

Certain frequency spectrum/bands may be opened for frequency sharing between unlicensed and licensed devices.

Licensed services operating in the band are considered primary users and may have priority use of the band. Unlicensed services operating in the band (e.g., Wi-Fi, LTE-LAA, NR-U, etc.) may be considered secondary users.

At this time, a system that controls spectrum utilization of secondary services may be required to prevent interference between licensed and unlicensed services.

In this regard, the frequency sharing system may control spectrum utilization by calculating available frequencies and maximum allowable power for secondary users(s). The secondary users(s) may negotiate maximum power information with the frequency sharing system through a communication protocol.

For clarity of explanation, in the present disclosure, the existing primary user is referred to/defined as a victim radio station, and the secondary user is referred to/defined as a Radio Local Area Network (RLAN) or a standard power device.

The maximum allowable power calculation method and communication protocol in a frequency sharing system described in the present disclosure are applicable to a Korean-type frequency sharing system. That is, the method proposed in the present disclosure may be applied to a Korean-type Automated Frequency Coordination (KAFC) system.

However, the calculation method and communication protocol in the frequency sharing system described in the present disclosure may be extended and applied to frequency sharing systems in other types/countries.

FIG. 1 illustrates a structure of a Korean-type Automated Frequency Coordination (KAFC) system according to an embodiment of the present disclosure.

Referring to FIG. 1, the KAFC system may be composed of a number of functional blocks that perform different roles.

Specifically, the KAFC system may be configured to include a database update function block (110), a KAFC system internal database function block (120), a KAFC system logging function block (130), a protection area contour generation function block (140), a spectrum availability analysis function block (150), and a standard power device connection and response function block (160).

The general operation of a KAFC system may be as follows.

After receiving a frequency request from a standard power device, the frequency sharing system may check the approval of the standard power device and the validity of the data. If satisfied, the spectrum availability analysis function may respond to the standard power device with the maximum allowable output power level considering the location uncertainty based on the location information and frequency request information, and log the event.

Here, the protection area contour required for spectrum availability analysis may be determined using a pre-calculated result from the protection zone contour generation function, or may be calculated based on real-time coordinate information.

Additionally, when changes occur in the primary user database and terrain elevation/morphology database, the protection area contour generation function needs to be additionally updated after updating the KAFC database.

For example, the specific functions of each detailed block of the KAFC system may be as follows.

The database update function block (110) may perform a download of the latest copy of the regulatory database required for the operation of the frequency sharing system. Additionally, the database update function block (110) may perform reconciliation with existing records (e.g., adding new records, deleting expired records, modifying changed records, etc.). Additionally, the database update function block (110) may retrieve information on KAFC device models/types approved by national regulatory agencies.

The KAFC system internal database function block (120) may perform primary service and secondary service parameter updates and modifications. Additionally, the KAFC system internal database function block (120) may perform fixed radio station link creation and verification.

The KAFC system logging function block (130) may perform reception and storage of events related to the KAFC system function. Additionally, the KAFC system logging function block (130) may perform a preservation function for records of compliance with regulatory requirements. Additionally, the KAFC system logging function block (130) may perform report generation for system management.

The protection area contour generation function block (140) may perform addition, deletion, and update for the protection area contour. Additionally, the protection area contour generation function block (140) may perform management and update for the latest propagation model and related algorithm. Additionally, the protection area contour generation function block (140) may perform merging for the same link protection area contour.

The spectrum availability analysis function block (150) may select a maximum allowable reference output power based on location uncertainty. Additionally, the spectrum availability analysis function block (150) may identify a maximum allowable power spectral density (PSD) in each 1 MHz band. Additionally, the spectrum availability analysis function block (150) may identify a maximum allowable effective isotropic radiated power (EIRP) for each channel.

The standard power device connection and response function block (160) may perform a reception wait for an inbound HTTPS secure message. Additionally, the standard power device connection and response function block (160) may perform message exchange related to encryption and other security parameters. Additionally, the standard power device connection and response function block (160) may authenticate each inbound request suitable for the implementation. Additionally, the standard power device connection and response function block (160) may perform data validity checking of the received/incoming message including the device identifier. Additionally, the standard power device connection and response function block (160) may construct and transmit a spectrum inquiry response message related to the requesting KAFC device.

In the following disclosure, in relation to the spectrum availability analysis function of the aforementioned KAFC system and the standard power device connection and response function, a method for calculating the available frequency and maximum transmission power used in the corresponding function and a communication protocol related thereto are proposed through specific examples.

First, a method for processing multiple protection area contours simultaneously is described in detail.

The protection area contour needs to be calculated for all cases, depending on the output power of the RLAN corresponding to the interferer (i.e., secondary user), antenna ground height, and indoor/outdoor.

Table 1 shows an example of a protection area contour type.

TABLE 1

| Type | Output power (dBm) | Antenna ground height (m) | Indoor/Outdoor |
|---|---|---|---|
| $P_1$dBm-$h_1$-Indoor | $P_1$ | $h_1$ | Indoor |
| $P_1$dBm-$h_1$-Outdoor | $P_1$ | $h_1$ | Outdoor |
| $P_1$dBm-$h_2$-Indoor | $P_1$ | $h_2$ | Indoor |
| $P_1$dBm-$h_2$-Outdoor | $P_1$ | $h_2$ | Outdoor |
| $P_2$dBm-$h_1$-Indoor | $P_2$ | $h_1$ | Indoor |
| $P_2$dBm-$h_1$-Outdoor | $P_2$ | $h_1$ | Outdoor |
| $P_2$dBm-$h_2$-Indoor | $P_2$ | $h_2$ | Indoor |
| $P_2$dBm-$h_2$-Outdoor | $P_2$ | $h_2$ | Outdoor |

Referring to Table 1, if the output power is of two types, $P_1$dBm and $P_2$dBm, the antenna ground height is of two types, $h_1$ and $h_2$, and the building penetration loss is 6 dB in the outdoor/indoor segment, eight (i.e., 2*2*2) final protection area contours may be derived. That is, eight protection area contours need to be generated for each single link, as illustrated in Table 1.

In this regard, if the output power, antenna ground height, and outdoor/indoor are distinguished each time a contour is generated, a similar calculation process shall be performed eight times, which may excessively increase the contour generation time.

To solve these problems, a method is proposed in which the output power and indoor/outdoor generate four protection area contours through a single contour generation process. However, in the case of the antenna ground height, since the receiving antenna gain and propagation model loss values change when the height of the interference source changes, the processing needs to be performed for the corresponding number of times.

Below, a method for calculating the maximum allowable transmission power and frequency range is specifically described.

The maximum allowable transmit power may be computed using information on the protection area contour of the victim (i.e., the primary user) and the location uncertainty of the RLAN.

Here, the location uncertainty of the RLAN may mean the area where the RLAN may be located at a given confidence level. The location uncertainty of the RLAN may be expressed/configured in various forms.

Figure 2:
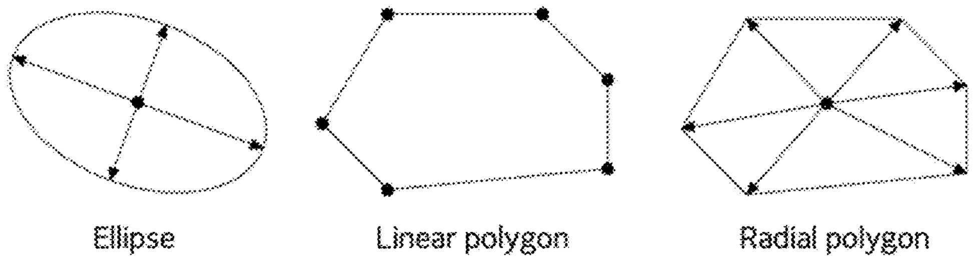
FIG. 2 illustrates various types of location uncertainty of an RLAN according to an embodiment of the present disclosure.

FIG. 2 illustrates various types of location uncertainty of an RLAN according to an embodiment of the present disclosure.

Referring to FIG. 2, the location uncertainty of the RLAN may be expressed in various shapes such as an ellipse, a linear polygon, a radial polygon, etc.

Specifically, the location uncertainty of an ellipse type may be expressed by specifying the geographic coordinates of the center, the lengths of the minor and major axes, and the direction angles.

The location uncertainty of a linear polygon type may be expressed by specifying the geographic coordinates of the polygon vertices.

The location uncertainty of a radial polygon type may be expressed by specifying the geographic coordinates of the center, the angle and the length of a vector starting at the center and ending at a polygon vertex.

Below, a method for selecting/calculating the maximum allowable reference output power based on location uncertainty is specifically described.

Figure 3:
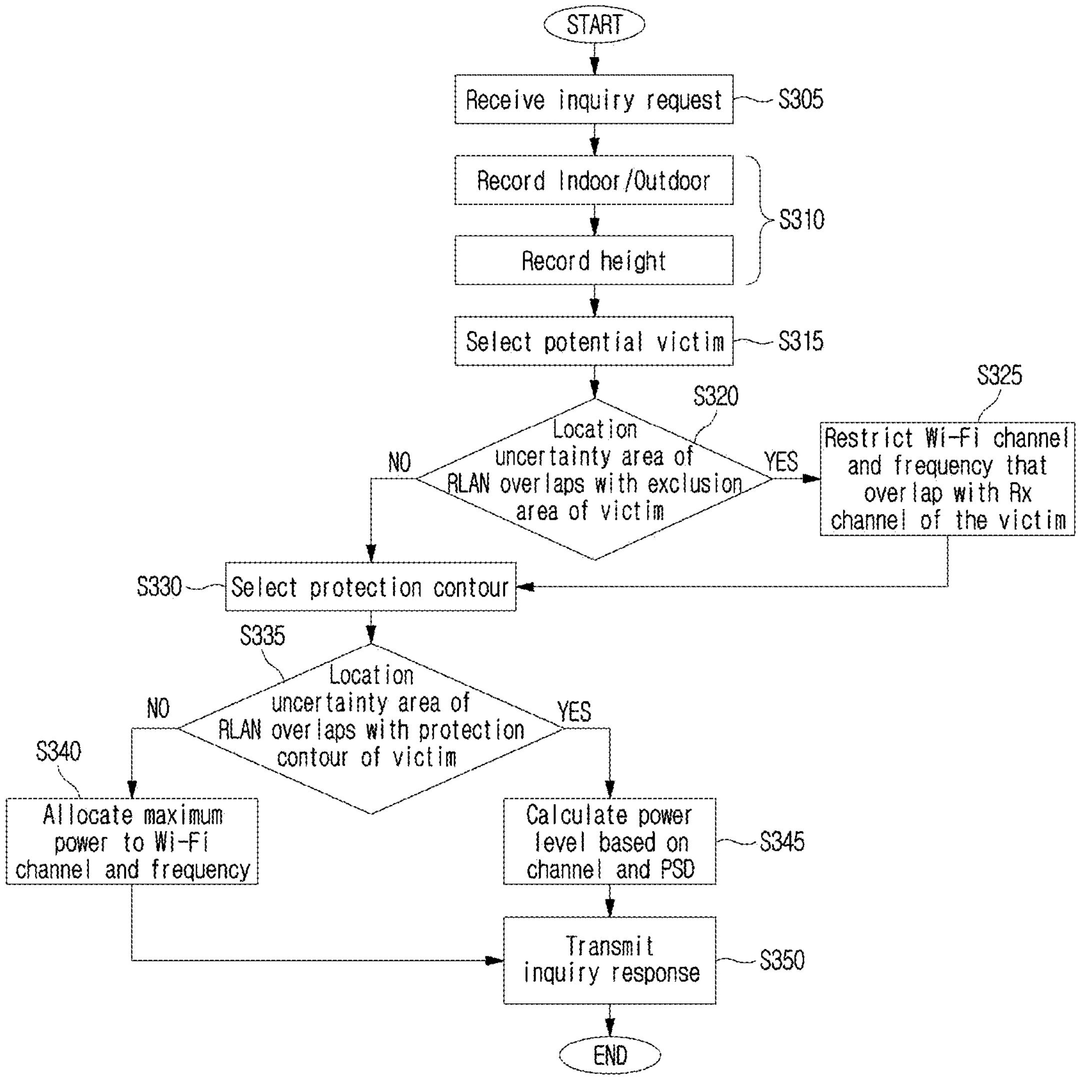
FIG. 3 illustrates an available spectrum query procedure according to an embodiment of the present disclosure.

FIG. 3 illustrates an available spectrum query procedure according to an embodiment of the present disclosure.

Referring to FIG. 3, it may correspond to a procedure performed by the frequency sharing system in the present disclosure.

To request the maximum allowable power for a specific frequency, the RLAN may transmit an available spectrum inquiry request message to the frequency sharing system, and the frequency sharing system may receive the inquiry request (S305).

In constructing an available spectrum inquiry request message, an RLAN may specify credentials, location information, a requested frequency, and other information as needed.

Here, the credentials may correspond to information required to perform device authentication and authorization. The location information may include geographic location information of the device, including vertical and horizontal uncertainty of the RLAN. The requested frequency may be indicated in the form of a channel or frequency range of the RLAN.

The frequency sharing system may record the height of the device and whether it is indoors using the location information included in the inquiry request message (S310).

For example, a frequency sharing system may use location information to determine and record information on where an RLAN exists and whether it exists indoors or outdoors.

Here, the location of the device may help identify potential victim radio stations.

The frequency sharing system may select a potential victim based on the distance between the victim (i.e., the receiver of the victim radio station) and the interferer RLAN (S315).

After a potential victim is identified, the frequency sharing system may determine, based on an algorithm or the like, whether the location uncertainty area of the RLAN overlaps with an exclusion area centered around the victim (i.e., the receiver of the victim radio station) (S320).

If the location uncertainty area and the exclusion zone of an RLAN overlap, the frequency sharing system may restrict all RLAN channels and frequencies (e.g., Wi-Fi channels and frequencies) that overlap/duplicate with the receive (Rx) channel of the victim (S325).

If the location uncertainty area of the RLAN and the exclusion area do not overlap, that is, if the location uncertainty area of the RLAN exists outside the exclusion area, the frequency sharing system may select a protection area contour based on an algorithm, etc. (S330).

Figure 4:
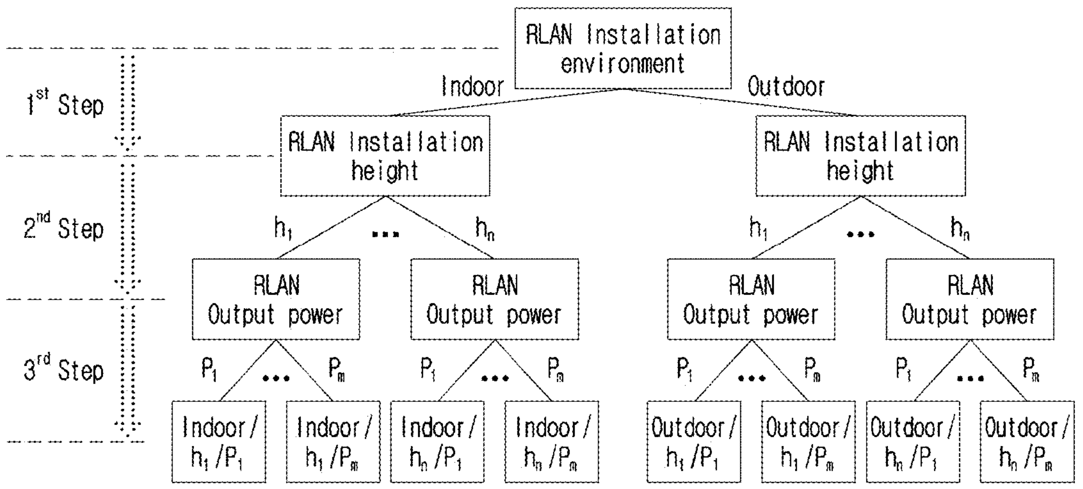
FIG. 4 illustrates a method for selecting a protection area contour according to an embodiment of the present disclosure.

FIG. 4 illustrates a method for selecting a protection area contour according to an embodiment of the present disclosure.

The selection of the protection area contour in FIG. 4 is explained assuming that, with respect to the generation of the protection area contour, the location of the RLAN has two types (i.e., indoor or outdoor), the height of the RLAN has n types (i.e., $h_1$ to $h_n$), and the transmit power level (Tx power level) of the RLAN has m types (i.e., $P_1$ to $P_m$).

In this case, (2*n*m) protection area contours may be associated with each victim receiver link.

For example, according to the protection area contour defined in Table 1, n may be set to 2 considering two heights of 10 m and 40 m, and m may be set to 2 by selecting two transmission power levels of 27 dBm and 30 dBm. According to Table 1, a total of eight protection area contours may be defined for each victim link. This is only one example, and the method proposed in the present disclosure may be extended and applied to n and m set to other numbers and values.

The specific procedure for selecting a protection area contour by a frequency sharing system may be as follows.

First, the frequency sharing system may determine whether a device (e.g., RLAN) is located indoors or outdoors from the received spectrum inquiry request message ($1^{st}$ Step of FIG. 4).

In this regard, if not specified in the request message, the RLAN may be considered to be located outdoors.

Next, the frequency sharing system may select only the protection area contour with the height matching the largest value by using the reference height and vertical uncertainty value information included in the received spectrum inquiry request message ($2^{nd}$ Step of FIG. 4).

In this regard, the height may be selected as the lowest available height that is greater than the height value obtained by adding the reference height of the RLAN to the vertical uncertainty.

For example, referring to the protection area contour defined in Table 1, if the sum of the RLAN height and uncertainty is less than or equal to 10 m, a 10 m height may be selected, otherwise a 40 m height may be selected.

Finally, the frequency sharing system may select a protection area contour corresponding to m among (2*n*m) protection area contours ($3^{rd}$ Step of FIG. 4).

Information on the selected protection area contour, i.e., the protection area contour of the victim(s), may be used to calculate the maximum allowable power.

Based on the selection of the protection area contour, the frequency sharing system may determine whether the location uncertainty area of the RLAN overlaps with the protection area contour of the victim(s) (S335).

If the location uncertainty area of the RLAN does not overlap with the protection area contour, the frequency sharing system may allocate maximum power (i.e., maximum power level) to the channel and frequency (e.g., Wi-Fi channel and frequency) of the RLAN (S340).

On the other hand, if the location uncertainty area of the RLAN overlaps with the protection area contour, the frequency sharing system may calculate the power level based on the channel and power spectral density (PSD) (S345).

As described above, information on the allocated/calculated power level may be returned to the RLAN using an available spectrum query response message (S350).

In the present disclosure below, a method for calculating the maximum allowable output power per channel unit or per 1 MHz frequency unit of an RLAN is described through specific examples.

The content described below may correspond to step S345 in FIG. 3, i.e., a specific method for calculating power levels based on channels and PSD.

In the procedure described in FIG. 3, the allowable power level may be requested on a per RLAN channel basis (i.e., channel-based request) and/or on a per 1 MHz frequency basis (i.e., PSD-based request).

In this regard, for channel-based requests, the RLAN may specify a channel number for which power level is to be queried. For PSD-based requests, the RLAN may specify a required frequency range over which the maximum allowable power level per MHz is expected to be received.

The frequency sharing system may calculate the maximum allowable transmit power level by using the selected protection area contour and the location uncertainty of the RLAN through the procedure of FIG. 4.

Figure 5:
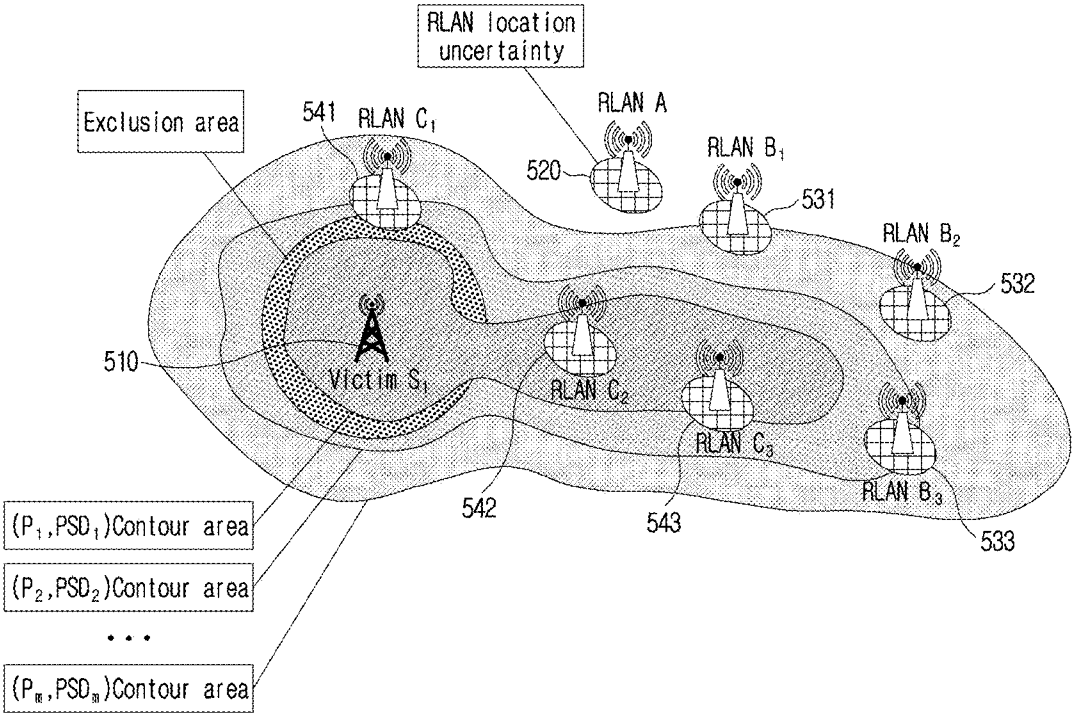
FIG. 5 illustrates an exclusion area and a protection area contour and a location uncertainty area of the RLAN for a single victim according to an embodiment of the present disclosure.

FIG. 5 illustrates an exclusion area and a protection area contour and a location uncertainty area of the RLAN for a single victim according to an embodiment of the present disclosure.

That is, FIG. 5 shows an example scenario showing the location of a victim radio station and a deployable RLAN.

Referring to FIG. 5, an exclusion area indicated by a circle may be set for the victim radio station $S_1$ (510).

In this regard, the RLANs may be placed at different locations that overlap or do not overlap the protection area contour and exclusion area of the victim radio station $S_1$ (510).

As a specific example, RLAN A (520) may be an example of an RLAN positioned at a location that does not overlap the protection area contour and exclusion area of the victim radio station $S_1$ (510). Additionally, RLAN $B_1$ (531), RLAN $B_2$ (532), RLAN $B_3$ (533), RLAN $C_2$ (542), and RLAN $C_3$ (543) may be examples of RLANs positioned at a location that overlaps the protection area contour of the victim radio station $S_1$ (510). Additionally, RLAN $C_1$ (541) may be an example of an RLAN positioned at a location that overlaps both the protection area contour and exclusion area of the victim radio station $S_1$ (510).

m protection area contours may be selected for the victim radio station $S_1$ (510).

For clarity of explanation, the present disclosure is explained by using as a representative example a case where three protection area contours, i.e., ($P_1$, $PSD_1$), ($P_2$, $PSD_2$), and ($P_3$, $PSD_3$) exist/are selected. That is, the present disclosure is explained by assuming that the m value is set to 3. The proposed method in the present disclosure may be extended and applied even when a different number of protection area contours exist/are selected.

In this regard, every protection area contour may be defined as a pair of channel power P and 1 MHz power PSD.

Additionally, for the output power P of the protection area contour, if the location uncertainty area of the RLAN does not overlap with the protection area contour, the frequency sharing system may define/calculate an allowable power level calculated based on the same frequency/same bandwidth that the RLAN may use.

In relation to the maximum power level in the present disclosure, in order to calculate the channel-based maximum allowable output power of the RLAN, a frequency dependent rejection (FDR) value may be additionally considered and (ultimately) determined.

The frequency dependent rejection value may refer to the ability of the receiver filter of the victim station to attenuate or block a particular frequency. Other frequencies may pass through relatively unaffected. The frequency dependent rejection value may vary depending on the channel center frequency and bandwidth of the victim station and the interferer (i.e., RLAN).

Additionally, the PSD-based maximum allowable output power of the RLAN may be defined as the power level available for the RLAN to perform transmission in the receive channel bandwidth range of the victim radio station, taking into account the output power level of the selected protection area contour.

Below, a specific example of allocating the maximum allowable power for each RLAN shown in FIG. 5 is described.

Figure 6:
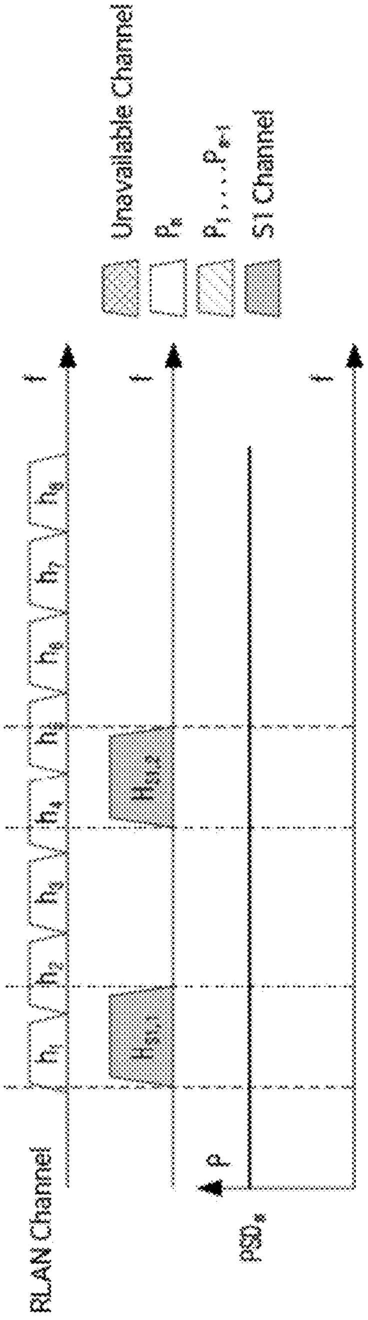
FIG. 6 illustrates channel-based power allocation and PSD-based power allocation for RLAN A according to an embodiment of the present disclosure.

FIG. 6 illustrates channel-based power allocation and PSD-based power allocation for RLAN A according to an embodiment of the present disclosure.

Referring to FIG. 6, the victim radio station $S_1$ (510) may be configured with two receiving channels $H_{S1,1}$ and $H_{S1,2}$. Additionally, eight channels $h_1$ to $h_8$ may be set for RLAN A (520).

Since RLAN channels $h_3$, $h_6$, $h_7$, $h_8$ do not overlap with the channels of the victim radio station $S_1$ (510), the maximum power $P_m$ defined in the corresponding protection area contour may be allocated.

Additionally, since the location uncertainty area of RLAN A (520) does not overlap with the protection area contour and/or a exclusion area of the victim radio station $S_1$ (510), the maximum power $P_m$ may also be allocated for RLAN channels $h_1$, $h_2$, $h_4$, $h_5$ that overlap with $H_{S1,1}$ and $H_{S1,2}$.

Similarly, for every 1 MHz of the overall frequency range, a maximum power $PSD_m$ defined for the corresponding protection area contour may be allocated.

Figure 7:
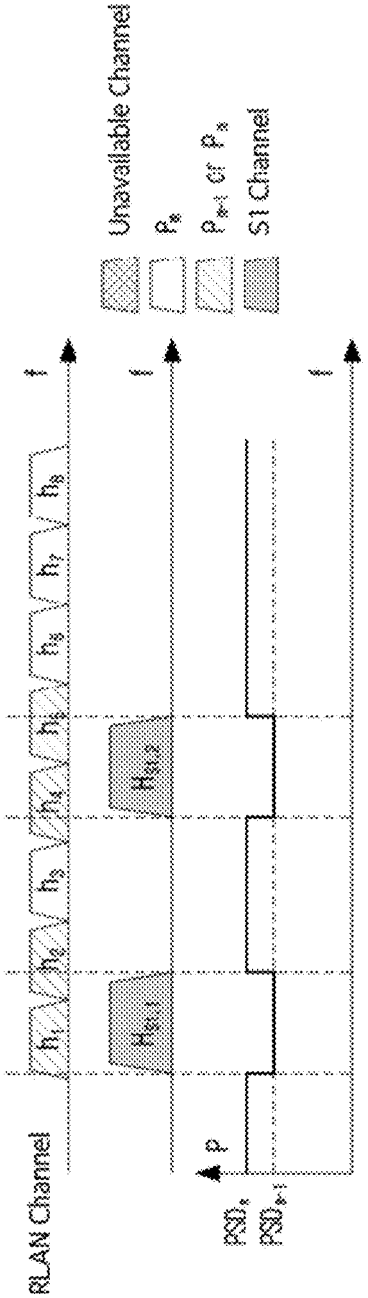
FIG. 7 illustrates channel-based power allocation and PSD-based power allocation for RLAN $B_1$ and RLAN $B_2$ according to an embodiment of the present disclosure.

FIG. 7 illustrates channel-based power allocation and PSD-based power allocation for RLAN $B_1$ and RLAN $B_2$ according to an embodiment of the present disclosure.

Referring to FIG. 7, the victim radio station $S_1$ (510) may be configured with two receiving channels $H_{S1,1}$ and $H_{S1,2}$. Additionally, eight channels $h_1$ to $h_8$ may be set for each of RLAN $B_1$ (531) and RLAN $B_2$ (532).

Since RLAN channels $h_3$, $h_6$, $h_7$, and $h_8$ do not overlap with the channels of the victim radio station $S_1$ (510), the maximum power $P_m$ defined in the corresponding protection area contour may be allocated.

The location uncertainty area of RLAN $B_1$ (531) and RLAN $B_2$ (532) overlap with the protection area contour ($P_m$, $PSD_m$).

In this case, the maximum power level assignable to RLAN channels $h_1$, $h_2$, $h_4$, $h_5$ overlapping with the channel of the victim radio station $S_1$ (510) may be set to $P_{m-1}$.

In this regard, a higher power $P_m$ may be allocated for RLAN channels $h_1$, $h_2$, $h_4$, $h_5$ if certain conditions are satisfied (e.g., $P_{m-1}$+FDR($h_i$, H) is greater than or equal to $P_m$). Here, FDR($h_i$, H) represents the FDR value calculated for RLAN channel $h_i$ and victim channel H.

For PSD-based power allocation, $PSD_{m-1}$ is allocated for a frequency range overlapping with the reception channel of the victim radio station $S_1$ (510), and a maximum $PSD_m$ may be allocated for all frequency ranges except for that frequency range.

Figure 8:
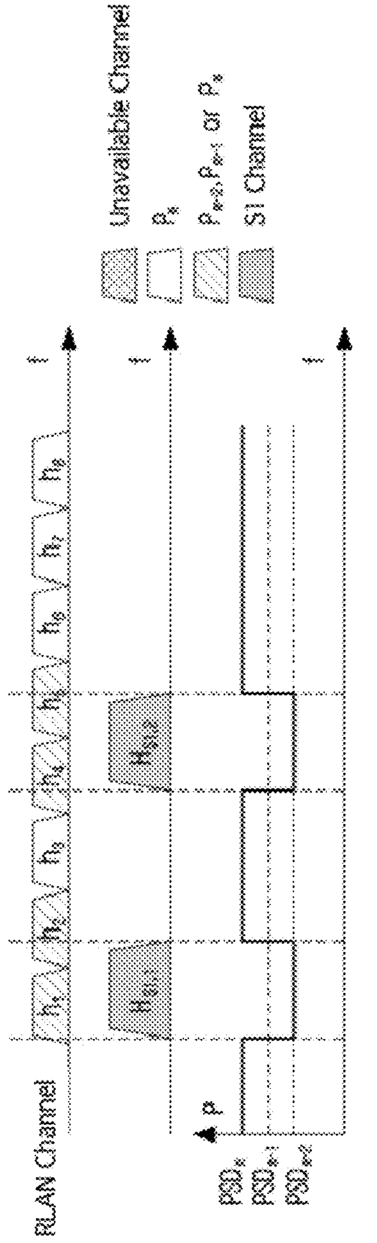
FIG. 8 illustrates channel-based power allocation and PSD-based power allocation for RLAN $B_3$ according to an embodiment of the present disclosure.

FIG. 8 illustrates channel-based power allocation and PSD-based power allocation for RLAN $B_3$ according to an embodiment of the present disclosure.

Referring to FIG. 8, the victim radio station $S_1$ (510) may be configured with two receive channels $H_{S1,1}$ and $H_{S1,2}$. Additionally, eight channels $h_1$ to $h_8$ may be set for RLAN $B_3$ (533).

Since RLAN channels $h_3$, $h_6$, $h_7$, $h_8$ do not overlap with the channels of the victim radio station $S_1$ (510), the maximum power $P_m$ defined in the corresponding protection area contour may be allocated.

The location uncertainty area of RLAN $B_3$ (533) overlaps ($P_2$, $PSD_2$) corresponding to the protection area contour ($P_{m-1}$, $PSD_{m-1}$).

In this case, the maximum power level assignable to RLAN channels $h_1$, $h_2$, $h_4$, $h_5$ overlapping with the channel of the victim radio station $S_1$ (510) may be set to $P_{m-2}$.

In this regard, if $P_{m-2}$+FDR($h_i$, H) is greater than or equal to $P_{m-1}$, the maximum power levels for RLAN channels $h_1$, $h_2$, $h_4$, $h_5$ may be increased up to $P_{m-1}$. Additionally, if $P_{m-2}$+FDR($h_i$, H) is greater than or equal to $P_m$, the maximum power levels for RLAN channels $h_1$, $h_2$, $h_4$, $h_5$ may be increased up to $P_m$. Here, FDR($h_i$, H) represents an FDR value calculated for RLAN channel $h_i$ and victim channel H.

For PSD-based power allocation, $PSD_{m-2}$ is allocated for a frequency range overlapping with the receive channel of the victim radio station $S_1$ (510), and a maximum $PSD_m$ may be allocated for all frequency ranges except for that frequency range.

Figure 9:
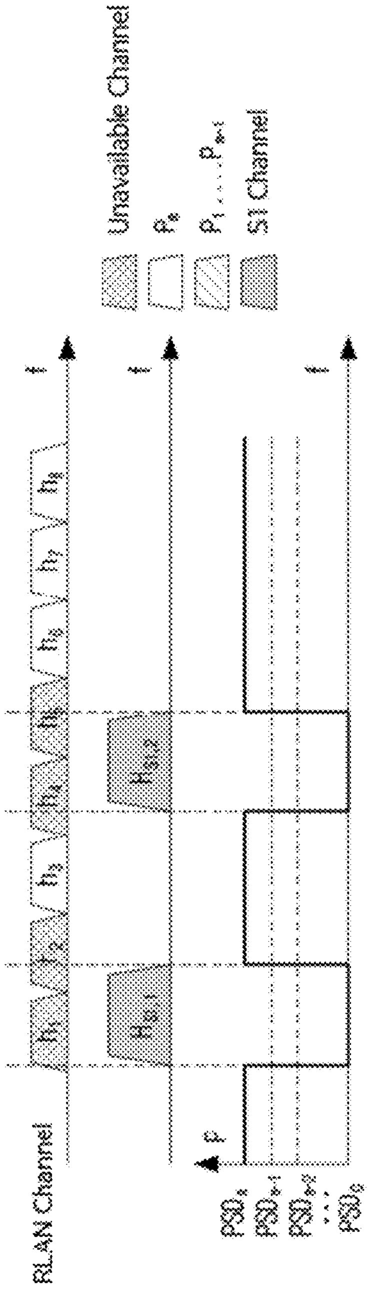
FIG. 9 illustrates channel-based power allocation and PSD-based power allocation for RLAN $C_1$, RLAN $C_2$, and RLAN $C_3$ according to an embodiment of the present disclosure.

FIG. 9 illustrates channel-based power allocation and PSD-based power allocation for RLAN $C_1$, RLAN $C_2$, and RLAN $C_3$ according to an embodiment of the present disclosure.

Referring to FIG. 9, the victim radio station $S_1$ (510) may be configured with two receiving channels $H_{S1,1}$ and $H_{S1,2}$. Additionally, eight channels $h_1$ to $h_8$ may be set for each of RLAN $C_1$ (541), RLAN $C_2$ (542), and RLAN $C_3$ (543).

Since RLAN channels $h_3$, $h_6$, $h_7$, $h_8$ do not overlap with the channels of the victim radio station $S_1$ (510), the maximum power $P_m$ defined in the corresponding protection area contour may be allocated.

The location uncertainty area of RLAN $C_1$ (541) overlaps with the exclusion area of victim station $S_1$ (510), and the location uncertainty area of RLAN $C_2$ (542) and RLAN $C_3$ (543) overlap with ($P_1$, $PSD_1$) corresponding to the protection area contour ($P_{m-2}$, $PSD_{m-2}$).

In this case, very low power may be set/allocated for RLAN channels $h_1$, $h_2$, $h_4$, $h_5$ that overlap with the channel of the victim radio station $S_1$ (510) so that the RLAN cannot use them.

Similarly, for PSD-based power allocation, a predefined very low $PSD_0$ is allocated for the frequency range overlapping with the receive channel of the victim radio station $S_1$ (510) so that the RLAN cannot use it, and a maximum $PSD_m$ may be allocated for all frequency ranges except that frequency range.

Figure 10:
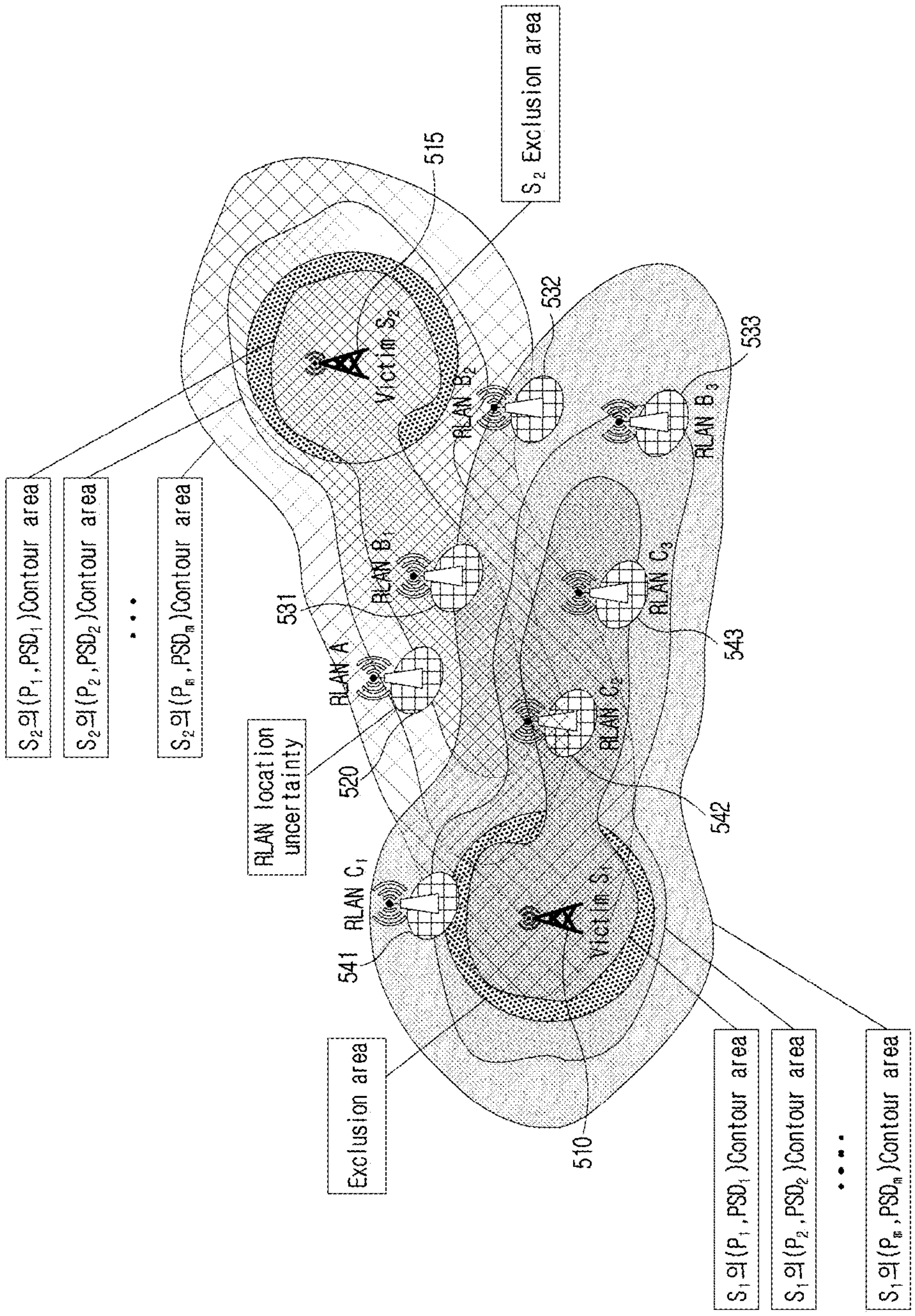
FIG. 10 illustrates an exclusion area and a protection area contour for multiple victims and a location uncertainty area of RLANs according to an embodiment of the present disclosure.

FIG. 10 illustrates an exclusion area and a protection area contour for multiple victims and a location uncertainty area of RLANs according to an embodiment of the present disclosure.

FIG. 10 illustrates an example scenario showing the locations of multiple victim radio stations and deployable RLANs.

Compared to FIG. 5, a new victim radio station $S_2$ (515) is added, and a protection area contour and a exclusion area (i.e., a fixed-distance protection area) for the victim radio station are additionally considered.

To illustrate the impact of adding a new victim radio, i.e. a new link, on the allowable power level of the RLAN, the location of the RLAN in FIG. 5 remains the same in FIG. 10.

When calculating the maximum allowable power level in a scenario where multiple victim radio stations are present, the frequency sharing system may calculate the power for each victim link individually.

Afterwards, in the case of the channel-based method, the minimum value may be selected from the results for each victim link as in Equation 1.

$$P_h = \min(P_h(S_1), P_h(S_2), P_h(S_3), \ldots P_k(S_k)) \quad \text{[Equation 1]}$$

In Equation 1, Ph represents the maximum allowable power level for the RLAN when using channel h, $P_h(S)$ represents the allowable power of channel h when considering only one victim S, and k represents the total number of victims.

Additionally or alternatively, for the PSD-based approach, the minimum PSD value may be selected from the results for each victim link as in Equation 2.

$$PSD_i = \min(PSD_i(S_1), PSD_i(S_2), PSD_i(S_3), \ldots PSD_i(S_k)) \quad \text{[Equation 2]}$$

In Equation 2, $PSD_i$ represents the maximum allowable PSD power for the ith 1 MHz of the requested frequency range, $PSD_i(S)$ represents the allowable PSD power for the $i^{th}$ 1 MHz when considering only one sacrifice S, and k represents the total number of victims.

Below, a specific example of allocating the maximum allowable power for each RLAN illustrated in FIG. 10 is described.

The following description is an example to explain the concept of power allocation when multiple victim links overlap, and may be extended to power allocation for various layouts in which two or more victim links exist.

Figure 11:
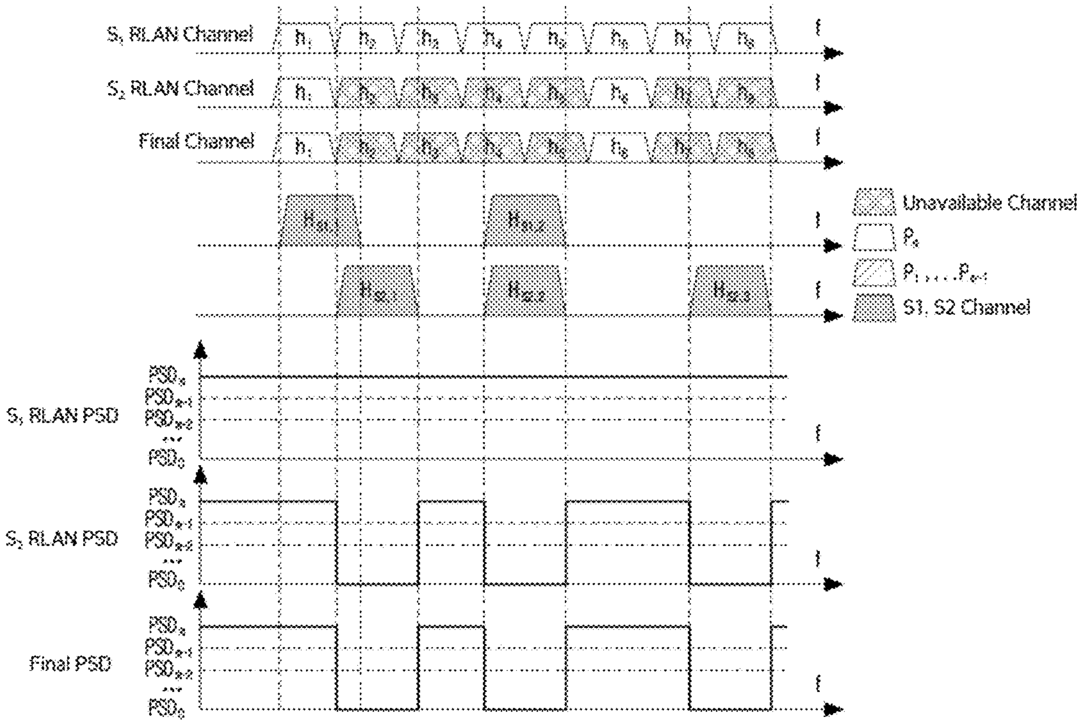
FIG. 11 illustrates channel-based power allocation and PSD-based power allocation for RLAN A according to an embodiment of the present disclosure.

FIG. 11 illustrates channel-based power allocation and PSD-based power allocation for RLAN A according to an embodiment of the present disclosure.

Referring to FIG. 11, the victim radio station $S_1$ (510) may be configured with two receive channels $H_{S1,1}$ and $H_{S1,2}$, and the victim radio station $S_2$ (515) may be configured with three receive channels $H_{S2,1}$, $H_{S2,2}$ and $H_{S2,3}$. Additionally, eight channels $h_1$ to $h_8$ may be set for RLAN A (520).

The location uncertainty area of RLAN A (520) does not overlap with the protection area contour of victim station $S_1$ (510), but overlaps with the protection area contour ($P_1$, $PSD_1$) of victim radio station $S_2$ (515).

In the channel-based power allocation method, if only the victim radio station $S_1$ (510) is considered, all RLAN channels may be allocated with the maximum power $P_m$. On the other hand, if only the victim radio station $S_2$ (515) is considered, RLAN channels $h_2$, $h_3$, $h_4$, $h_5$, $h_7$, and $h_8$ may be set to unavailable.

At this time, the maximum allowable power for each channel may be derived/determined based on the Equation 1 described above.

In the PSD-based power allocation scheme, when only the victim radio station $S_1$ (510) is considered, $PSD_m$ may be allocated for every 1 MHz of the requested frequency range. Additionally, when only the victim radio station $S_2$ (515) is considered, predefined $PSD_0$ power may be allocated to the frequency range overlapping with channels $H_{S2,1}$, $H_{S2,2}$, and $H_{S2,3}$ of the victim radio station $S_2$ (515). That is, when only the victim radio station $S_2$ (515) is considered, the corresponding frequency range may be set so that the RLAN cannot use it.

At this time, the final PSD value may be derived/determined based on the Equation 2 described above.

Figure 12:
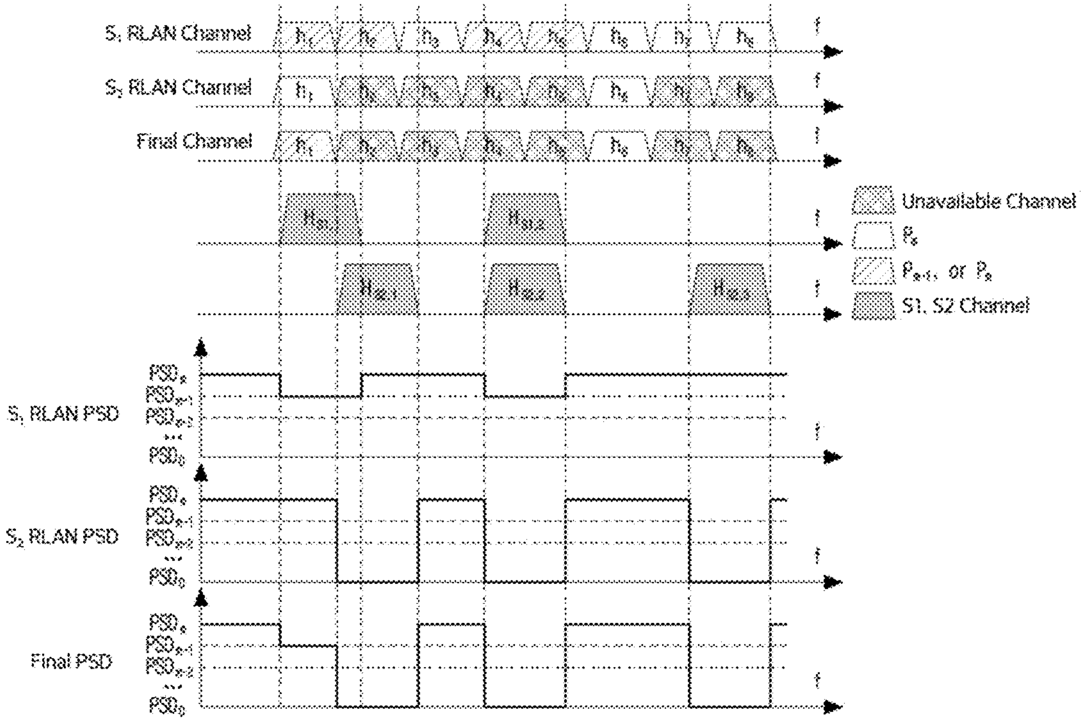
FIG. 12 illustrates channel-based power allocation and PSD-based power allocation for RLAN $B_1$ according to an embodiment of the present disclosure.

FIG. 12 illustrates channel-based power allocation and PSD-based power allocation for RLAN $B_1$ according to an embodiment of the present disclosure.

Referring to FIG. 12, the victim radio station $S_1$ (510) may be configured with two receive channels $H_{S1,1}$ and $H_{S1,2}$, and the victim radio station $S_2$ (515) may be configured with three receive channels $H_{S2,1}$, $H_{S2,2}$ and $H_{S2,3}$. Additionally, eight channels $h_1$ to $h_8$ may be set for RLAN $B_1$ (531).

The location uncertainty area of RLAN $B_1$ (531) overlaps the protection area contour ($P_m$, $PSD_m$) of the victim radio station $S_1$ (510) and the protection area contour ($P_1$, $PSD_1$) of the victim radio station $S_2$ (515).

In a channel-based power allocation scheme, when only the victim radio station $S_1$ (510) is considered, RLAN channels $h_1$, $h_2$, $h_4$, $h_5$ may be allocated with power levels $P_{m-1}$ or $P_m$. On the other hand, when only the victim radio station $S_2$ (515) is considered, RLAN channels $h_2$, $h_3$, $h_4$, $h_5$, $h_7$, $h_8$ may be set to unavailable.

At this time, the maximum allowable power for each channel may be derived/determined based on the Equation 1 described above.

In the PSD-based power allocation method, when only the victim radio station $S_1$ (510) is considered, $PSD_{m-1}$ may be allocated to a frequency range overlapping with channels $H_{S1,1}$ and $H_{S1,2}$ of the victim radio station $S_1$ (510). Additionally, when only the victim radio station $S_2$ (515) is considered, predefined $PSD_0$ power may be allocated to a frequency range overlapping with channels $H_{S2,1}$, $H_{S2,2}$ and $H_{S2,3}$ of the victim radio station $S_2$ (515). That is, when only the victim radio station $S_2$ (515) is considered, the corresponding frequency range may be set so that the RLAN may not use it.

At this time, the final PSD value may be derived/determined based on the Equation 2 described above.

Figure 13:
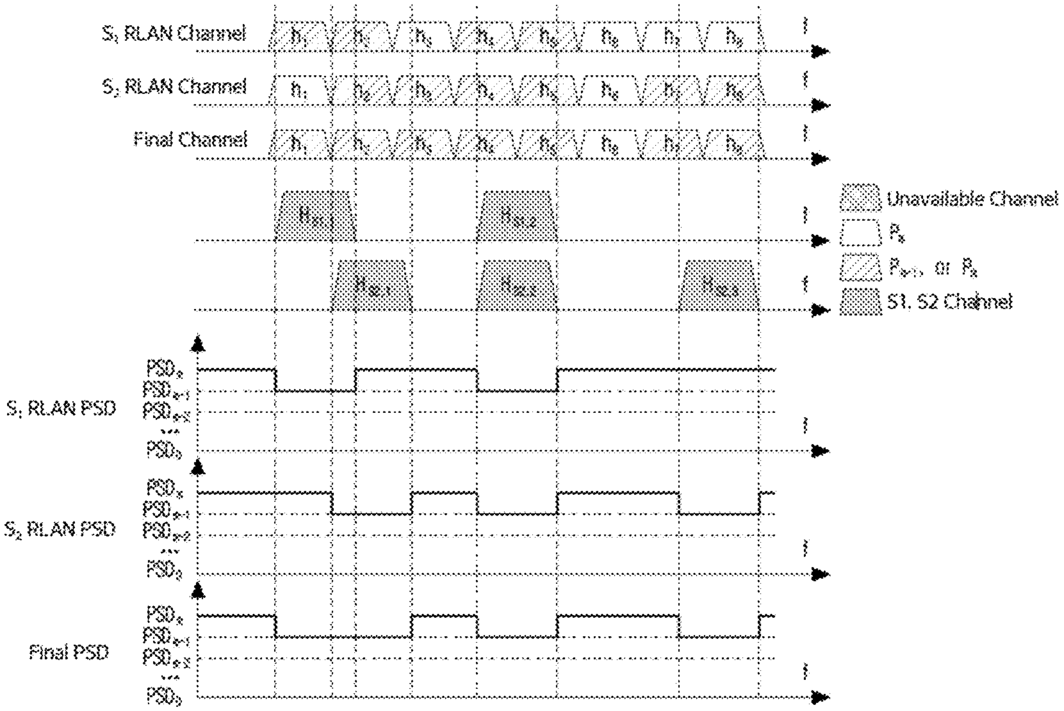
FIG. 13 illustrates channel-based power allocation and PSD-based power allocation for RLAN $B_2$ according to an embodiment of the present disclosure.

FIG. 13 illustrates channel-based power allocation and PSD-based power allocation for RLAN $B_2$ according to an embodiment of the present disclosure.

Referring to FIG. 13, the victim radio station $S_1$ (510) may be configured with two receive channels $H_{S1,1}$ and $H_{S1,2}$, and the victim radio station $S_2$ (515) may be configured with three receive channels $H_{S2,1}$, $H_{S2,2}$ and $H_{S2,3}$. Additionally, eight channels $h_1$ to $h_8$ may be set for RLAN $B_2$ (532).

The location uncertainty area of RLAN $B_2$ (532) overlaps the protection area contour ($P_m$, $PSD_m$) of the victim radio station $S_1$ (510) and the protection area contour ($P_m$, $PSD_m$) of the victim radio station $S_2$ (515).

In a channel-based power allocation scheme, when only the victim radio station $S_1$ (510) is considered, RLAN channels $h_1$, $h_2$, $h_4$, $h_5$ may be allocated with power levels $P_{m-1}$ or $P_m$. On the other hand, when only the victim radio station $S_2$ (515) is considered, RLAN channels $h_2$, $h_3$, $h_4$, $h_5$, $h_7$, $h_8$ may be allocated with power levels $P_{m-1}$ or $P_m$.

At this time, the maximum allowable power for each channel may be derived/determined based on the Equation 1 described above.

In the PSD-based power allocation method, when only the victim radio station $S_1$ (510) is considered, $PSD_{m-1}$ may be allocated to a frequency range overlapping with channels $H_{S1,1}$ and $H_{S1,2}$ of the victim radio station $S_1$ (510). Additionally, when only the victim radio station $S_2$ (515) is considered, $PSD_{m-1}$ may be allocated to a frequency range overlapping with channels $H_{S2,1}$, $H_{S2,2}$ and $H_{S2,3}$ of the victim radio station $S_2$ (515).

At this time, the final PSD value may be derived/determined based on the Equation 2 described above.

Figure 14:
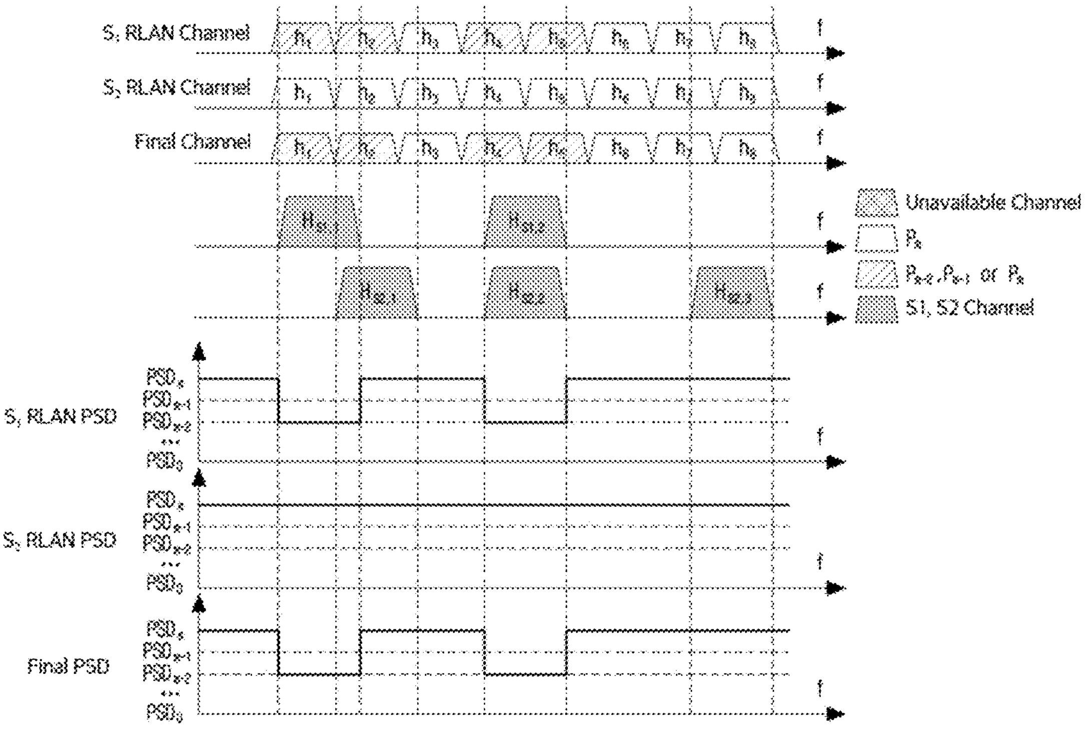
FIG. 14 illustrates channel-based power allocation and PSD-based power allocation for RLAN $B_3$ according to an embodiment of the present disclosure.

FIG. 14 illustrates channel-based power allocation and PSD-based power allocation for RLAN $B_3$ according to an embodiment of the present disclosure.

Referring to FIG. 14, the victim radio station $S_1$ (510) may be configured with two receive channels $H_{S1,1}$ and $H_{S1,2}$, and the victim radio station $S_2$ (515) may be configured with three receive channels $H_{S2,1}$, $H_{S2,2}$ and $H_{S2,3}$. Additionally, eight channels $h_1$ to $h_8$ may be set for RLAN $B_3$ (533).

The location uncertainty area of RLAN $B_3$ (533) overlaps the protection area contour ($P_2$, $PSD_2$) of the victim radio station $S_1$ (510), but does not overlap the protection area contour of the victim radio station $S_2$ (515).

In a channel-based power allocation scheme, when only the victim radio station $S_1$ (510) is considered, RLAN channels $h_1$, $h_2$, $h_4$, $h_5$ may be allocated with power levels $P_{m-2}$, $P_{m-1}$, or $P_m$. On the other hand, when only the victim radio station $S_2$ (515) is considered, all RLAN channels can be allocated with the maximum power $P_m$.

At this time, the maximum allowable power for each channel can be derived/determined based on the Equation 1 described above.

In the PSD-based power allocation method, when only the victim radio station $S_1$ (510) is considered, $PSD_{m-2}$ may be allocated to the frequency range overlapping with channels $H_{S1,1}$ and $H_{S1,2}$ of the victim radio station $S_1$ (510). Additionally, when only the victim radio station $S_2$ (515) is considered, $PSD_m$ may be allocated for every 1 MHz of the requested frequency range.

At this time, the final PSD value may be derived/determined based on the Equation 2 described above.

Figure 15:
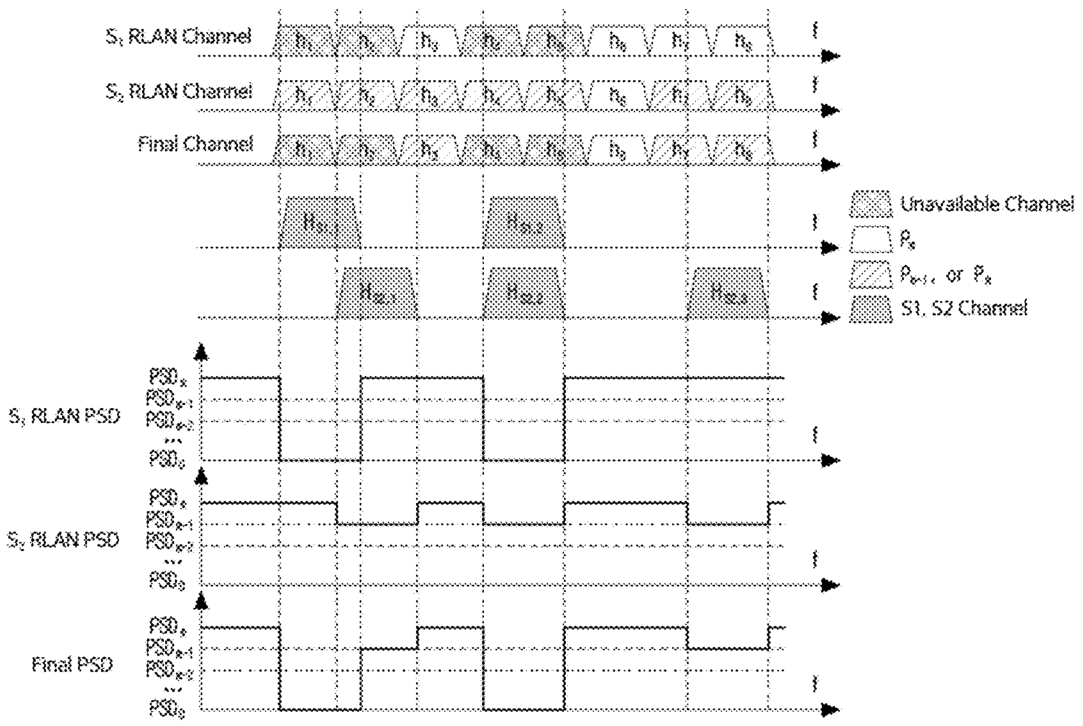
FIG. 15 illustrates channel-based power allocation and PSD-based power allocation for RLAN $C_1$ according to an embodiment of the present disclosure.

FIG. 15 illustrates channel-based power allocation and PSD-based power allocation for RLAN $C_1$ according to an embodiment of the present disclosure.

Referring to FIG. 15, the victim radio station $S_1$ (510) may be configured with two receive channels $H_{S1,1}$ and $H_{S1,2}$, and the victim radio station $S_2$ (515) may be configured with three receive channels $H_{S2,1}$, $H_{S2,2}$ and $H_{S2,3}$. Additionally, eight channels $h_1$ to $h_8$ may be set for RLAN $C_1$ (541).

The location uncertainty area of RLAN $C_1$ (541) overlaps the exclusion area of victim radio station $S_1$ (510) and the protection area contour ($P_m$, $PSD_m$) of victim radio station $S_2$ (515).

In the channel-based power allocation method, when only the victim radio station $S_1$ (510) is considered, RLAN channels $h_1$, $h_2$, $h_4$, $h_5$ may be set to unavailable. On the other hand, when only the victim radio station $S_2$ (515) is considered, RLAN channels $h_2$, $h_3$, $h_4$, $h_5$, $h_7$, $h_8$ may be allocated with power level $P_{m-1}$ or $P_m$.

At this time, the maximum allowable power for each channel may be derived/determined based on the Equation 1 described above.

In the PSD-based power allocation method, when only the victim radio station $S_1$ (510) is considered, a predefined $PSD_0$ power may be allocated to a frequency range overlapping with channels $H_{S1,1}$ and $H_{S1,2}$ of the victim radio station $S_1$ (510). That is, when only the victim radio station $S_1$ (510) is considered, the corresponding frequency range may be set so that the RLAN may not use it. Additionally, when only the victim radio station $S_2$ (515) is considered, $PSD_{m-1}$ may be allocated to a frequency range overlapping with channels $H_{S2,1}$, $H_{S2,2}$ and $H_{S2,3}$ of the victim radio station $S_2$ (515).

At this time, the final PSD value may be derived/determined based on the Equation 2 described above.

Figure 16:
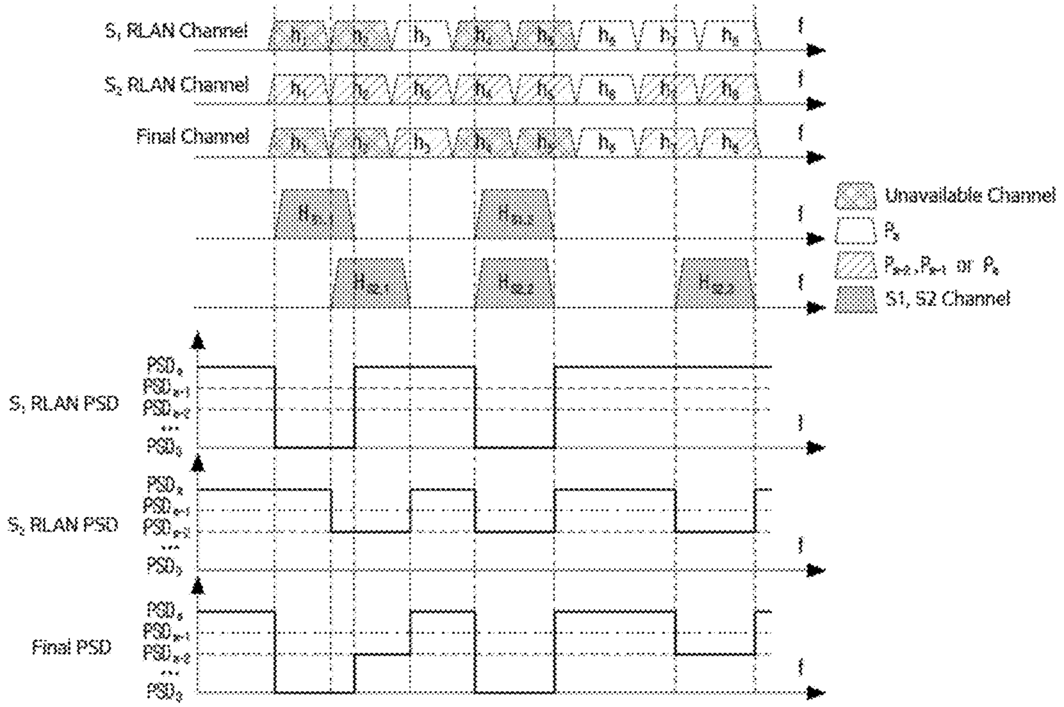
FIG. 16 illustrates channel-based power allocation and PSD-based power allocation for RLAN $C_2$ according to an embodiment of the present disclosure.

FIG. 16 illustrates channel-based power allocation and PSD-based power allocation for RLAN $C_2$ according to an embodiment of the present disclosure.

Referring to FIG. 16, the victim radio station $S_1$ (510) may be configured with two receive channels $H_{S1,1}$ and $H_{S1,2}$, and the victim radio station $S_2$ (515) may be configured with three receive channels $H_{S2,1}$, $H_{S2,2}$ and $H_{S2,3}$. Additionally, eight channels $h_1$ to $h_8$ may be set for RLAN $C_2$ (542).

The location uncertainty area of RLAN $C_2$ (542) overlaps the protection area contour ($P_1$, $PSD_1$) of the victim radio station $S_1$ (510) and the protection area contour ($P_2$, $PSD_2$) of the victim radio station $S_2$ (515).

In a channel-based power allocation scheme, when only the victim radio station $S_1$ (510) is considered, RLAN channels $h_1$, $h_2$, $h_4$, $h_5$ may be set to unavailable. On the other hand, when only the victim radio station $S_2$ (515) is considered, RLAN channels $h_2$, $h_3$, $h_4$, $h_5$, $h_1$, $h_8$ may be allocated with power levels $P_{m-2}$, $P_{m-1}$, or $P_m$.

At this time, the maximum allowable power for each channel may be derived/determined based on the Equation 1 described above.

In the PSD-based power allocation method, when only the victim radio station $S_1$ (510) is considered, a predefined $PSD_0$ power may be allocated to a frequency range overlapping with channels $H_{S1,1}$ and $H_{S1,2}$ of the victim radio station $S_1$ (510). That is, when only the victim radio station $S_1$ (510) is considered, the corresponding frequency range may be set so that the RLAN may not use it. Additionally, when only the victim radio station $S_2$ (515) is considered, $PSD_{m-2}$ may be allocated to a frequency range overlapping with channels $H_{S2,1}$, $H_{S2,2}$ and $H_{S2,3}$ of the victim radio station $S_2$ (515).

At this time, the final PSD value may be derived/determined based on the Equation 2 described above.

Figure 17:
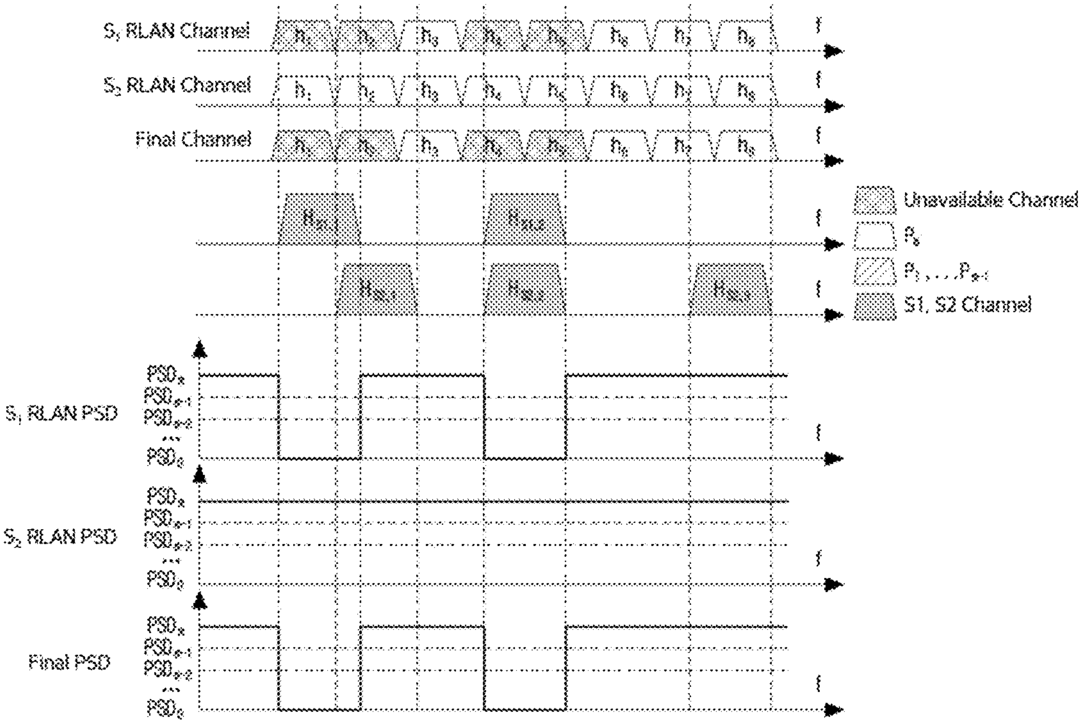
FIG. 17 illustrates channel-based power allocation and PSD-based power allocation for RLAN $C_3$ according to an embodiment of the present disclosure.

FIG. 17 illustrates channel-based power allocation and PSD-based power allocation for RLAN $C_3$ according to an embodiment of the present disclosure.

Referring to FIG. 17, the victim radio station $S_1$ (510) may be configured with two receive channels $H_{S1,1}$ and $H_{S1,2}$, and the victim radio station $S_2$ (515) may be configured with three receive channels $H_{S2,1}$, $H_{S2,2}$ and $H_{S2,3}$. Additionally, eight channels $h_1$ to $h_8$ may be set for RLAN $C_3$ (543).

The location uncertainty area of RLAN $C_3$ (543) overlaps the protection area contour ($P_1$, $PSD_1$) of the victim radio station $S_1$ (510), but does not overlap the protection area contour of the victim radio station $S_2$ (515).

In a channel-based power allocation scheme, when only the victim radio station $S_1$ (510) is considered, RLAN channels $h_1$, $h_2$, $h_4$, $h_5$ may be set to unavailable. On the other hand, when only the victim radio station $S_2$ (515) is considered, RLAN channels $h_2$, $h_3$, $h_4$, $h_5$, $h_7$, $h_8$ may be allocated with power level $P_m$.

At this time, the maximum allowable power for each channel may be derived/determined based on the Equation 1 described above.

In the PSD-based power allocation scheme, when only the victim radio station $S_1$ (510) is considered, a predefined $PSD_0$ power may be allocated to a frequency range overlapping with channels $H_{S1,1}$ and $H_{S1,2}$ of the victim radio station $S_1$ (510). That is, when only the victim radio station $S_1$ (510) is considered, the corresponding frequency range may be set so that the RLAN may not use it. Additionally, when only the victim radio station $S_2$ (515) is considered, $PSD_m$ may be allocated for every 1 MHz of the requested frequency range.

At this time, the final PSD value may be derived/determined based on the Equation 2 described above.

Next, with respect to the available spectrum query procedure as described above, an efficient connection method between standard power devices and frequency sharing systems, i.e., a communication protocol is proposed.

All standard power devices (i.e., the aforementioned RLANs) are required to perform an inquiry (or query) to the frequency sharing system regarding available frequencies and maximum allowable power levels prior to using the shared frequencies.

Figure 18:
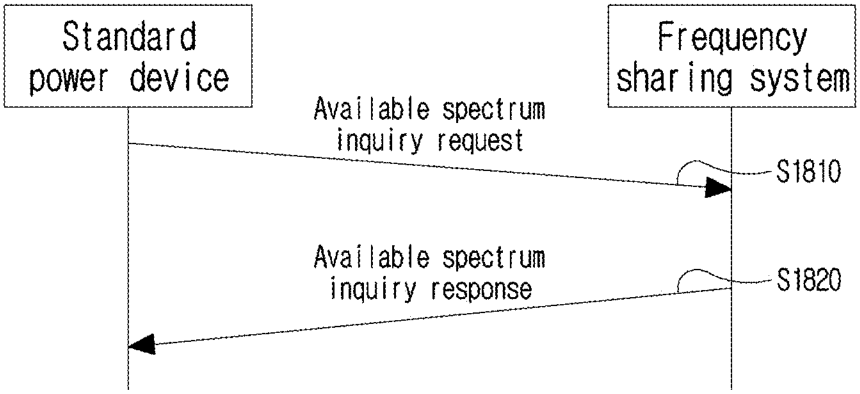
FIG. 18 illustrates a request and response procedure for an available spectrum query according to an embodiment of the present disclosure.

The query may be performed using a message exchange protocol such as that of FIG. 18.

FIG. 18 illustrates a request and response procedure for an available spectrum query according to an embodiment of the present disclosure.

Referring to FIG. 18, a standard power device may transmit an available spectrum inquiry request message to a frequency sharing system (S1810).

The frequency sharing system that receives the request message may calculate the allowable power level based on it.

Thereafter, the frequency sharing system may respond to the standard power device via an available spectrum inquiry response message with information on the calculated allowable power level (S1820).

Based on the information contained in the response message, the standard power device selects an operating channel and may use a transmit power that does not exceed the maximum output power level calculated/defined in the frequency sharing system.

In this regard, standard power devices need to provide essential information for frequency sharing systems to conduct successful spectrum inquiry.

Table 2 illustrates the information provided by a standard power device to request an available spectrum inquiry.

TABLE 2

| Inquiry request identification information | Request ID |
|---|---|
| Device Information | Serial number<br>Authentication number |
| Location information | Geographic location and horizontal uncertainty<br>Device height and vertical uncertainty<br>Indoor or not |
| Spectrum information inquiry | Inquiry request channel number<br>Frequency range of query requests |
| Etc. | Other control information |

Referring to Table 2, a spectrum inquiry request message transmitted by a standard power device may include inquiry request identification information, device information, location information, spectrum information inquiry related information, and other control information.

Specifically, the inquiry request identification information may include a request ID field used for request identification and retransmission.

Device information may include a serial number, authentication number, or other information that helps the frequency controller (FC) perform authentication, authorization, and determine device class, category, etc.

Location information may be essential information for calculating the allowable power level. Additionally, if the spectrum sharing system recognizes that a standard power device is present indoors, the spectrum sharing system may be able to allocate a higher power level to the standard power device located indoors, thus helping to utilize the spectrum more efficiently.

In this regard, the spectrum may be inquired by channel or by PSD. Specifically, in a channel-based spectrum query, the standard power device may request a channel number for which it wants to obtain maximum allowable power information. In a PSD-based spectrum inquiry, the standard power device may request a frequency range for which it wants to obtain maximum allowable power information per 1 MHz.

Additionally, the frequency sharing device needs to provide essential information to the standard power device to successfully complete the spectrum inquiry.

Table 3 illustrates the information provided to successfully complete a spectrum inquiry.

TABLE 3

| Inquiry request identification information | Request ID |
|---|---|
| Spectrum information | Maximum power level for each channel inquired<br>PSD information per 1 MHz for each frequency range inquired |

TABLE 3-continued

| Inquiry request identification information | Request ID |
|---|---|
| Response Code | Predefined codes for possible inquiry results |
| Expiration time | The time until the spectral information for that response becomes valid. |
| New and alternate URL information | List of new or alternate access URLs |
| Etc | Other control information |

Referring to Table 3, a spectrum inquiry response message transmitted by a frequency sharing system may include inquiry request identification information, spectrum information, response code related information, expiration time related information, new and replacement uniform resource locator (URL) information, and other control information.

The request ID may be used for mapping between a spectrum request and its response. In this case, the spectrum request and its response need to have the same ID.

For a channel-based spectrum inquiry, the frequency sharing system may respond with power information for the requested channel. For a PSD-based spectrum inquiry, the frequency sharing system may respond with 1 MHz power information for the requested frequency range.

Additionally, the spectrum sharing system may specify a response code so that the standard power device may properly interpret the received response. The response code may be utilized to troubleshoot failed spectrum inquiry in the standard power device.

Additionally, the frequency sharing system may set an expiration time to notify the standard power device until the response is valid. When the validity timer expires, the standard power device may have to perform the inquiry again. This allows the frequency sharing system to efficiently control the frequency of the inquiry.

The standard power device may perform connection to the frequency sharing system using the URL related information included in the response message. The response message may include new URL information when the access RL changes. Additionally, if the standard power device may experience connection problems, alternative URL related information (e.g., a list of alternative URLs) may be included.

Additionally, with respect to the transmission procedure of the aforementioned spectrum inquiry request message, the present disclosure proposes a retransmission algorithm for error correction and reliability enhancement.

Figure 19:
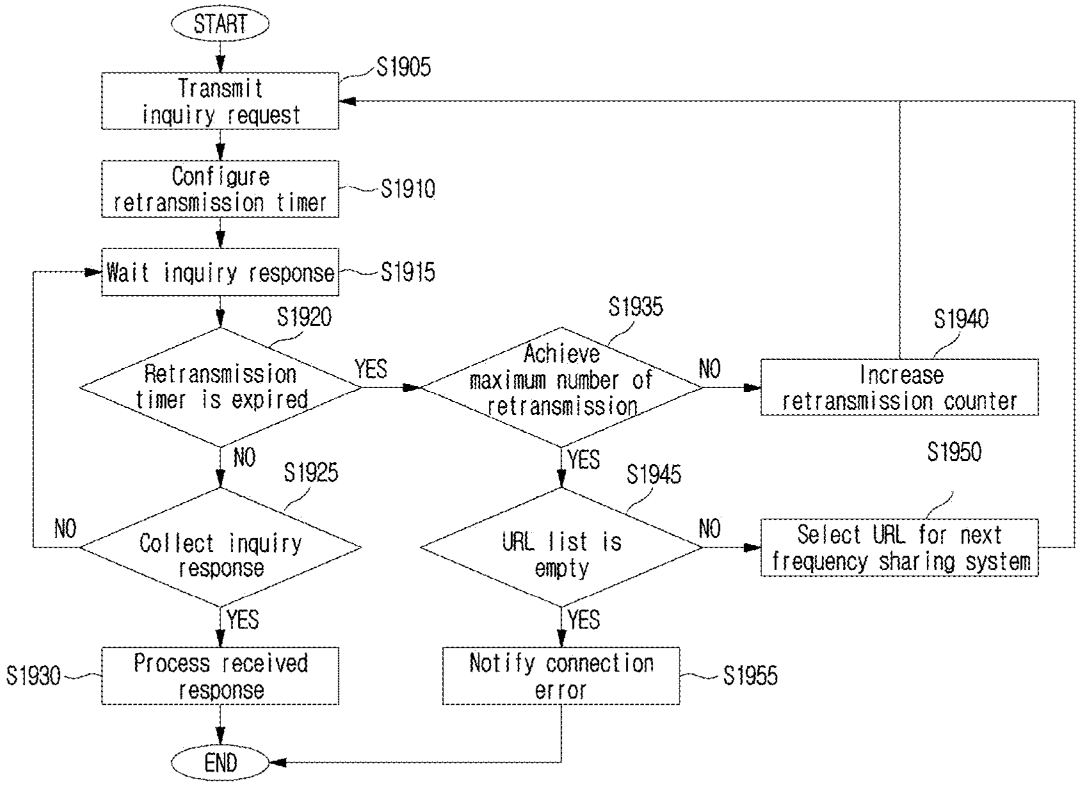
FIG. 19 illustrates a retransmission algorithm for an available spectrum inquiry request according to an embodiment of the present disclosure.

FIG. 19 illustrates a retransmission algorithm for an available spectrum inquiry request according to an embodiment of the present disclosure.

Referring to FIG. 19, whenever a standard power device transmits an available spectrum inquiry request message (S1905), it may set a retransmission timer (S1910). Here, the retransmission timer may be a configurable value that may be modified by a network manager.

If an available spectrum inquiry response message is not received from the frequency sharing system before the timer expires, a retransmission of the request message may be performed.

Specifically, the standard power device may wait for an inquiry response (S1915) and check whether a retransmission timer expires (S1920).

If the retransmission timer does not expire and the inquiry response message is collected by the standard power device (S1925), the standard power device may process the received response message (S1930). Conversely, if the retransmission timer does not expire and the inquiry response message is not collected by the standard power device (S1925), the standard power device may wait for the inquiry response message again (S1915).

Alternatively, if the retransmission timer expires, the standard power device may check whether the maximum number of retransmission attempts has been reached (S1935).

In this regard, the standard power device may maintain a retransmission counter to prevent infinite retransmission. The maximum number of retransmission attempts may correspond to a configurable parameter that may be set by the network administrator.

If the maximum number of retransmission attempts is not reached, the standard power device may increase the retransmission counter (S1940) and perform retransmission of the inquiry request message (S1905).

On the other hand, if the maximum number of retransmission attempts is reached, the standard power device can select a new connection URL from the URL list and restart the connection procedure based on the newly selected URL.

The procedure described above may be repeated repeatedly until a response from the frequency sharing system is received.

If a standard power device has tried to retransmit based on all URLs in the URL list but still does not receive a response message, it needs to report/send a notification on a connection error so that the network administrator may take appropriate action.

Specifically, the standard power device may check whether the URL list is empty (S1945). If the URL list is not empty, the standard power device may select the next frequency sharing system URL (S1950) and perform retransmission of the inquiry request message based on it (S1905). On the other hand, if the URL list is empty, the standard power device may report/transmit a notification on a connection error.

Additionally, information about new or alternate URL lists may be communicated to standard power policy via an available spectrum inquiry response message.

Additionally, with respect to the connection method between a standard power device and a frequency sharing system for the aforementioned spectrum inquiry request and response, the present disclosure proposes a connection method between a standard power device and a frequency sharing system using a proxy agent.

Figure 20:
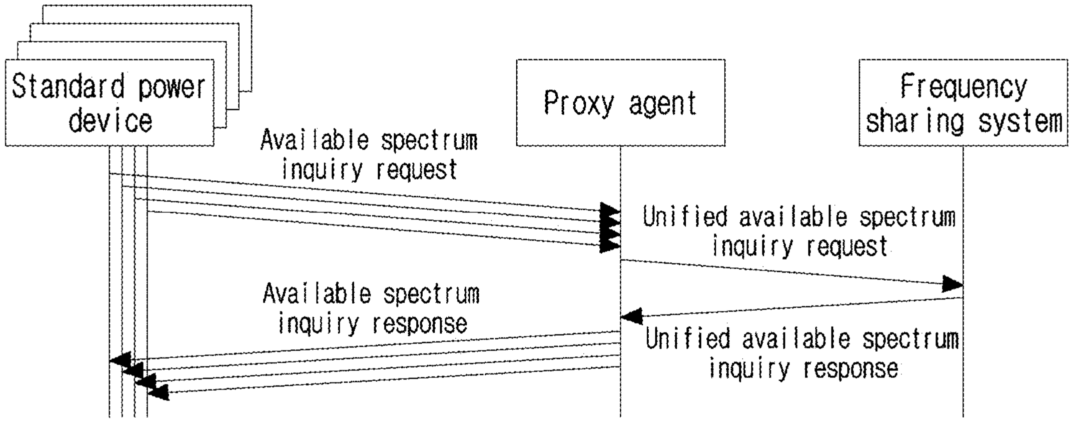
FIG. 20 illustrates a connection method between a standard power device and a frequency sharing system based on a proxy agent according to an embodiment of the present disclosure.

FIG. 20 illustrates a connection method between a standard power device and a frequency sharing system based on a proxy agent according to an embodiment of the present disclosure.

Referring to FIG. 20, a proxy agent may collect one or more spectrum query requests from one or more standard power devices, and transmit the collected spectrum inquiry requests to a frequency sharing system on behalf of the standard power devices.

The proxy agent may receive the collected responses from the frequency sharing system, and then the proxy agent may distribute/transmit individual responses to each standard power device.

In this regard, the proxy agent may store all response messages received from the frequency sharing system in a local cache.

Whenever a new spectrum inquiry request arrives at the proxy agent, the proxy agent may check its local cache to see if there is a valid response to that request.

If a valid response is available, the proxy agent may respond directly to the standard power device without forwarding the request message to the frequency sharing system. For example, when the standard power device is rebooted or the spectrum inquiry is refreshed, the standard power device may send a request message requesting the same device information, location information, and the same frequency as before. Through this, the load on the network and the frequency sharing system may be efficiently reduced.

Each entry in the local cache mentioned above may be valid until the expiration time specified in the corresponding response message. When an entry expires, the proxy agent may remove the entry from the local cache.

Figure 21:
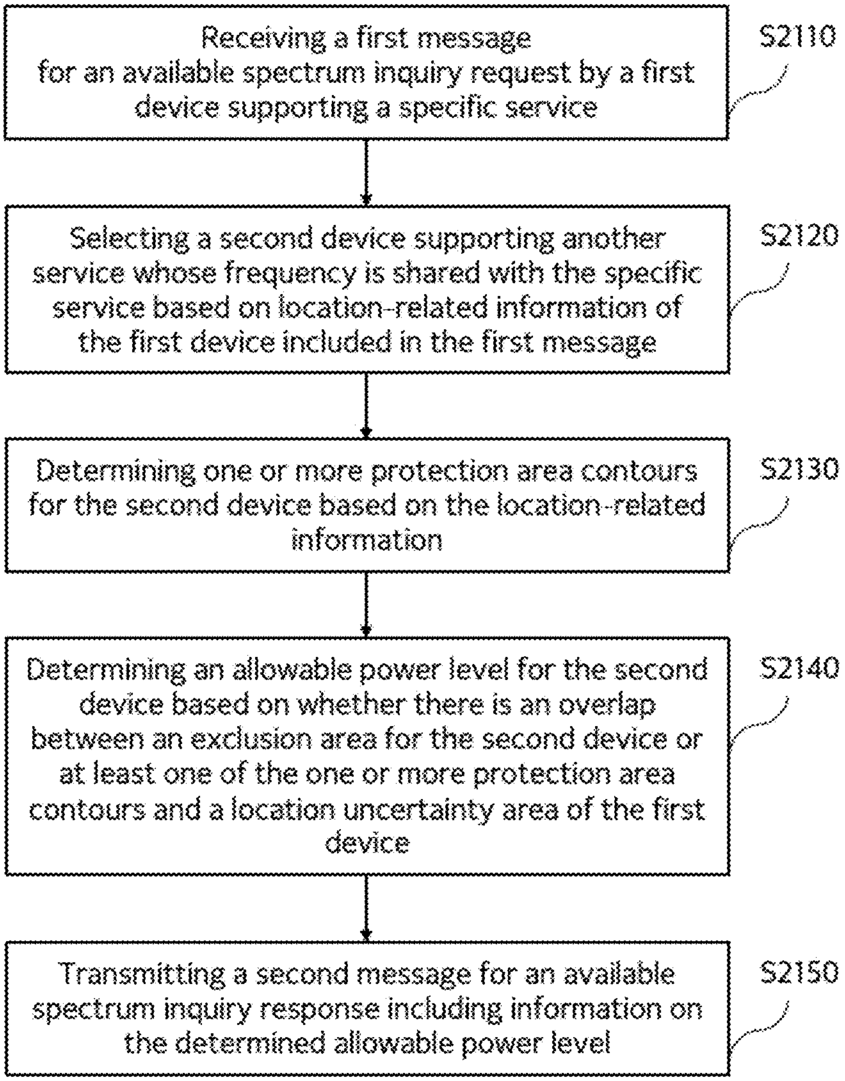
FIG. 21 illustrates an operational flowchart for an available spectrum query method according to an embodiment of the present disclosure.

FIG. 21 illustrates an operational flowchart for an available spectrum query method according to an embodiment of the present disclosure.

The operation in FIG. 21 may correspond to the operation performed by the frequency sharing system described above in the present disclosure.

The frequency sharing system may receive a first message for an available spectrum inquiry request by a first device supporting a specific service (S2110).

Here, the location-related information may include one or more of location coordinates, height, or uncertainty-related information for the first device.

For example, the first device may correspond to a secondary user, i.e., an RLAN/standard power device, supporting the unlicensed service described in the present disclosure, and the first message may correspond to an available spectrum inquiry request message described in the present disclosure.

The frequency sharing system may select a second device that supports the specific service and another service whose frequency is shared based on the location-related information of the first device included in the first message (S2120).

For example, the second device may correspond to a primary user supporting a licensed service, i.e., a victim radio station.

The frequency sharing system may determine one or more protection area contours for the second device based on the location-related information (S2130).

The frequency sharing system may determine an allowable power level for the second device based on whether there is an overlap between at least one of the exclusion area or the one or more protection area contours for the second device and the location uncertainty area of the first device (S2140).

For example, if the location uncertainty area of the first device overlaps with at least one of the one or more protection area contours for the second device, the allowable power level may be determined based on power information set in the overlapping protection area contours.

In this regard, the power information may be composed of a pair of a channel-based power value and a 1 MHz unit-based power value.

As a specific example, when the allowable power level is determined per channel of the first device based on the channel-based power value, the allowable power level may be determined by checking whether there is overlap between each channel of the first device and each channel of the second device. In this regard, the allowable power level may be determined by additionally applying a frequency dependent rejection (FDR) value to each channel of the first device.

As another specific example, when the allowable power level is determined based on the 1 MHz unit-based power value, the allowable power level may be determined by checking a frequency range that overlaps a frequency requested by the first device and each channel of the second device.

For another example, if the location uncertainty area of the first device overlaps with the exclusion area for the second device, the allowable power level may be set to a predefined minimum power level to restrict the channel and frequency of the first device.

The frequency sharing system may transmit a second message for an available spectrum inquiry response including information on the determined allowable power level as described above (S2150).

For example, the second message may correspond to the available spectrum inquiry response message described in the present disclosure.

Additionally or alternatively, the first message may be defined to be retransmittable based on a pre-configured maximum number of retransmissions or pre-configured connection uniform resource locator (URL) information.

Additionally or alternatively, the first message and the second message may be transmitted and received through a proxy agent connected to the first device, and information included in the second message may be stored in a cache of the proxy agent.

Figure 22:
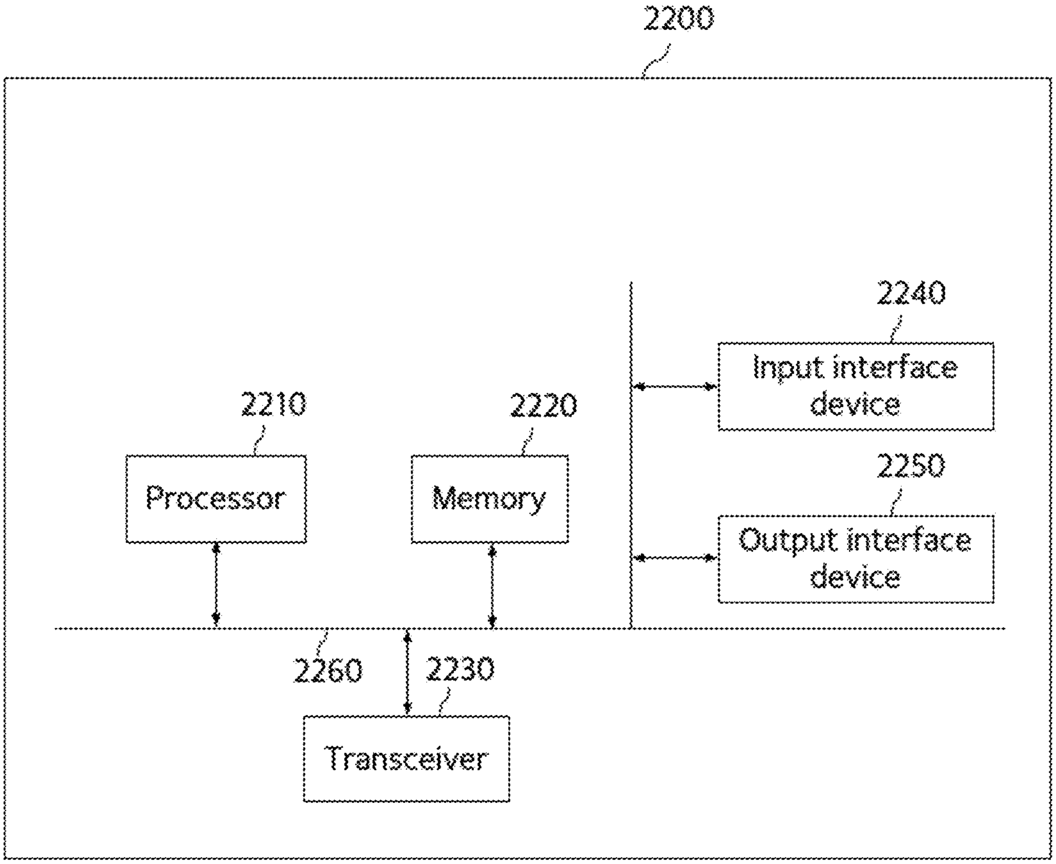
FIG. 22 is a block diagram illustrating a device according to an embodiment of the present disclosure.

FIG. 22 is a block diagram illustrating an apparatus according to an embodiment of the present disclosure.

Referring to FIG. 22, the apparatus (2200) may represent a device implementing the maximum allowable power level calculation method and communication protocol described in the present disclosure.

For example, the apparatus (2200) may generally support/perform functions such as transmitting and receiving available spectrum inquiry request messages and response messages, calculating transmission power levels based on a location uncertainty area, an exclusion area, and/or a protection area contour.

The device 2200 may include at least one of a processor 2210, a memory 2220, a transceiver 2230, an input interface device 2240, and an output interface device 2250. Each of the components may be connected by a common bus 2260 to communicate with each other. In addition, each of the components may be connected through a separate interface or a separate bus centering on the processor 2210 instead of the common bus 2260.

The processor 2210 may be implemented in various types such as an application processor (AP), a central processing unit (CPU), a graphic processing unit (GPU), etc., and may be any semiconductor device that executes a command stored in the memory 2220. The processor 2210 may execute a program command stored in the memory 2220. The processor (2210) may be configured to implement a maximum allowable power level calculation method and communication protocol based on FIGS. 1 to 21 described above.

And/or, the processor 2210 may store a program command for implementing at least one function for the corresponding modules in the memory 2220 and may control the operation described based on FIGS. 1 to 21 to be performed.

The memory 2220 may include various types of volatile or non-volatile storage media. For example, the memory 2220 may include read-only memory (ROM) and random access memory (RAM). In an embodiment of the present disclosure, the memory 2220 may be located inside or outside the processor 2210, and the memory 2220 may be connected to the processor 2210 through various known means.

The transceiver 2230 may perform a function of transmitting and receiving data processed/to be processed by the processor 2210 with an external device and/or an external system.

The input interface device 2240 is configured to provide data to the processor 2210.

The output interface device 2250 is configured to output data from the processor 2210.

According to the present disclosure, a method and device for estimating maximum allowable power of a frequency sharing system may be provided.

According to the present disclosure, a communication protocol between a secondary user and a frequency sharing system may be provided.

According to the present disclosure, there is an advantage in that frequency resource utilization may be increased by efficiently controlling interference that may occur when licensed service users and unlicensed service users coexist in a frequency band.

The components described in the example embodiments may be implemented by hardware components including, for example, at least one digital signal processor (DSP), a processor, a controller, an application-specific integrated circuit (ASIC), a programmable logic element, such as an FPGA, GPU other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment.

Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Accordingly, it is intended that this disclosure embrace all other substitutions, modifications and variations belong within the scope of the following claims.

What is claimed is:

1. A method for performing an available spectrum inquiry, comprising:

receiving a first message for an available spectrum inquiry request by a first device supporting a specific service;

selecting a second device supporting another service whose frequency is shared with the specific service based on location-related information of the first device included in the first message;

determining one or more protection area contours for the second device based on the location-related information;

determining an allowable power level for the second device based on whether there is an overlap between an exclusion area for the second device or at least one of the one or more protection area contours and a location uncertainty area of the first device; and transmitting a second message for an available spectrum inquiry response including information on the determined allowable power level, wherein the location-related information includes one or more of location coordinates, height, or uncertainty-related information for the first device.

2. The method of claim 1, wherein, if the location uncertainty area of the first device overlaps with the at least one of the protection area contours for the second device, the allowable power level is determined based on power information configured for an overlapping protection area contour.

3. The method of claim 2, wherein the power information includes a pair of a channel-based power value and a 1 MHz-based power value.

4. The method of claim 3, wherein, if the allowable power level is determined per channel of the first device based on the power value based on the channel, the allowable power level is determined by checking whether there is overlap between each channel of the first device and each channel of the second device.

5. The method of claim 4, wherein the allowable power level is determined by additionally applying a frequency dependent rejection value for each channel of the first device.

6. The method of claim 3, wherein, if the allowable power level is determined based on the 1 MHz-based power value, the allowable power level is determined by checking a frequency range that overlaps a frequency requested by the first device and each channel of the second device.

7. The method of claim 1, wherein, if the location uncertainty area of the first device overlaps with the exclusion area for the second device, the allowable power level is set to a pre-defined minimum power level to restrict a channel and a frequency of the first device.

8. The method of claim 1, wherein the first message is defined to be retransmittable based on a pre-configured maximum number of retransmissions or pre-configured connection uniform resource locator (URL) information.

9. The method of claim 1, wherein the first message and the second message are transmitted and received through a proxy agent connected to the first device, and wherein information included in the second message is stored in a cache of the proxy agent.

10. An apparatus of performing an available spectrum inquiry, the apparatus comprising:

at least one processor and at least one memory, wherein the processor is configured to:

receive a first message for an available spectrum inquiry request by a first device supporting a specific service;

select a second device supporting another service whose frequency is shared with the specific service based on location-related information of the first device included in the first message;

determine one or more protection area contours for the second device based on the location-related information;

determine an allowable power level for the second device based on whether there is an overlap between an exclusion area for the second device or at least one of the one or more protection area contours and a location uncertainty area of the first device; and transmit a second message for an available spectrum inquiry response including information on the determined allowable power level, wherein the location-related information includes one or more of location coordinates, height, or uncertainty-related information for the first device.

11. The apparatus of claim 10, wherein, if the location uncertainty area of the first device overlaps with the at least one of the protection area contours for the second device, the allowable power level is determined based on power information configured for an overlapping protection area contour.

12. The apparatus of claim 11, wherein the power information includes a pair of a channel-based power value and a 1 MHz-based power value.

13. The apparatus of claim 12, wherein, if the allowable power level is determined per channel of the first device based on the power value based on the channel, the allowable power level is determined by checking whether there is overlap between each channel of the first device and each channel of the second device.

14. The apparatus of claim 13, wherein the allowable power level is determined by additionally applying a frequency dependent rejection value for each channel of the first device.

15. The apparatus of claim 12, wherein, if the allowable power level is determined based on the 1 MHz-based power value, the allowable power level is determined by checking a frequency range that overlaps a frequency requested by the first device and each channel of the second device.

16. The apparatus of claim 10, wherein, if the location uncertainty area of the first device overlaps with the exclusion area for the second device, the allowable power level is set to a pre-defined minimum power level to restrict a channel and a frequency of the first device.

17. The apparatus of claim 10, wherein the first message is defined to be retransmittable based on a pre-configured maximum number of retransmissions or pre-configured connection uniform resource locator (URL) information.

18. The apparatus of claim 10, wherein the first message and the second message are transmitted and received through a proxy agent connected to the first device, and wherein information included in the second message is stored in a cache of the proxy agent.

19. One or more non-transitory computer readable medium storing one or more instructions, wherein the one or more instructions are executed by one or more processors and control an apparatus for performing an available spectrum inquiry to:

receive a first message for an available spectrum inquiry request by a first device supporting a specific service;

select a second device supporting another service whose frequency is shared with the specific service based on location-related information of the first device included in the first message;

determine one or more protection area contours for the second device based on the location-related information;

determine an allowable power level for the second device based on whether there is an overlap between an exclusion area for the second device or at least one of the one or more protection area contours and a location uncertainty area of the first device; and transmit a second message for an available spectrum inquiry response including information on the determined allowable power level, wherein the location-related information includes one or more of location coordinates, height, or uncertainty-related information for the first device.

20. The computer readable medium of claim 19, wherein, if the location uncertainty area of the first device overlaps with the at least one of the protection area contours for the second device, the allowable power level is determined based on power information configured for an overlapping protection area contour.

* * * * *